(12) United States Patent
Rahman et al.

(10) Patent No.: US 11,706,718 B2
(45) Date of Patent: Jul. 18, 2023

(54) UPLINK POWER CONTROL FOR ADVANCED WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/249,774

(22) Filed: Mar. 12, 2021

(65) Prior Publication Data
US 2021/0204223 A1    Jul. 1, 2021

Related U.S. Application Data

(63) Continuation of application No. 16/387,513, filed on Apr. 17, 2019, now Pat. No. 10,952,151.

(60) Provisional application No. 62/690,149, filed on Jun. 26, 2018, provisional application No. 62/675,516, filed on May 23, 2018, provisional application No.
(Continued)

(51) Int. Cl.
*H04W 52/14* (2009.01)
*H04W 52/38* (2009.01)
*H04W 52/28* (2009.01)

(52) U.S. Cl.
CPC ......... *H04W 52/146* (2013.01); *H04W 52/28* (2013.01); *H04W 52/38* (2013.01)

(58) Field of Classification Search
CPC .... H04W 52/146; H04W 52/28; H04W 52/38
See application file for complete search history.

(56) References Cited

U.S. PATENT DOCUMENTS 9,801,167 B2   10/2017  Moulsley et al.
2010/0039928 A1   2/2010  Noh et al.
(Continued)

FOREIGN PATENT DOCUMENTS

EP      2566120 A1    3/2013
WO   2009072956 A1    6/2009
(Continued)

OTHER PUBLICATIONS

"3rd Generation Partnership Project;Technical Specification Group Services and System Aspects; Feasibility Study on New Services and Markets Technology Enablers; Stage 1 (Release 14)", 3GPP TR 22.891 V14.2.0, Sep. 2016, 95 pages.
(Continued)

*Primary Examiner* — Min Jung

(57) ABSTRACT

A method of a user equipment (UE) for an uplink power control is provided. The method comprises transmitting, to a base station (BS), UE capability information including a full power transmission capability of the UE, receiving, from the BS, downlink control information (DCI) including a transmit precoding matrix indicator (TPMI), determining a power level for each antenna port at the UE based on the full power transmission capability of the UE and the TPMI, and transmitting, to the BS, UL data via physical uplink shared channel (PUSCH) based on the determined power level for each antenna port at the UE and the TPMI wherein the TPMI indicates a precoding matrix and a number of layers used to transmit the UL data via the PUSCH.

20 Claims, 11 Drawing Sheets

Related U.S. Application Data

62/674,983, filed on May 22, 2018, provisional application No. 62/665,241, filed on May 1, 2018, provisional application No. 62/659,860, filed on Apr. 19, 2018.

(56) References Cited

U.S. PATENT DOCUMENTS

| | | |
|---|---|---|
| 2010/0208838 A1 | 8/2010 | Lee et al. |
| 2010/0330959 A1 | 12/2010 | Mildh et al. |
| 2013/0039199 A1 | 2/2013 | Liao et al. |
| 2015/0071253 A1 | 3/2015 | Zhou et al. |
| 2015/0110215 A1 | 4/2015 | Wang et al. |
| 2015/0271761 A1 | 9/2015 | Park |
| 2017/0195100 A1 | 7/2017 | Kim et al. |
| 2017/0215157 A1 | 7/2017 | Yang et al. |
| 2018/0183503 A1 | 6/2018 | Rahman et al. |
| 2018/0254814 A1 | 9/2018 | Park et al. |
| 2018/0368083 A1* | 12/2018 | Yang .................. H04B 7/0486 |
| 2018/0376430 A1 | 12/2018 | Liu |
| 2019/0097710 A1 | 3/2019 | Park et al. |
| 2019/0306809 A1 | 10/2019 | Qi |
| 2019/0312617 A1 | 10/2019 | Wernersson et al. |
| 2019/0327693 A1 | 10/2019 | Rahman et al. |
| 2020/0092818 A1 | 3/2020 | Jiang et al. |
| 2020/0154364 A1 | 5/2020 | Rahman et al. |
| 2020/0186215 A1 | 6/2020 | Rahman et al. |
| 2020/0336998 A1 | 10/2020 | Rahman et al. |
| 2021/0314873 A1* | 10/2021 | Huang ................. H04L 5/0051 |

FOREIGN PATENT DOCUMENTS

| | | |
|---|---|---|
| WO | 2017043856 A1 | 3/2017 |
| WO | 2019203619 A1 | 10/2019 |

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 238 pages.

"3rd Generation Partnership Project;Technical Specification Group Radio Access Network; Evolved Universal Terrestrial Radio Access (E-UTRA); Multiplexing and channel coding (Release 15)", 3GPP TS 36.212 V15.5.0, Mar. 2019, 246 pages.

"3rd Generation Partnership Project; Technical Specification Group Radio Access Network: Evolved Universal Terrestrial Radio Access (E-UTRA): Physical layer procedures (Release 15)", 3GPP TS 36.213 V15.5.0, Mar. 2019, 552 pages.

"3rd Generation Partnership Project; Technical Specification Group Radio Access Network: Evolved Universal Terrestrial Radio Access (E-UTRA): Medium Access Control (MAC) protocol specification (Release 15)", 3GPP TS 36.321 V15.5.0, Mar. 2019, 131 pages.

"3rd Generation Partnership Project; Technical Specification Group Radio Access Network: Evolved Universal Terrestrial Radio Access (E-UTRA); Radio Resource Control (RRC); Protocol specification (Release 15)", 3GPP TS 36.331 V15.5.0, Mar. 2019, 944 pages.

"3rd Generation Partnership Project; Technical Specification Group Radio Access Network; NR; Physical channels and modulation (Release 15)", 3GPP TS 38.211 V15.5.0, Mar. 2019, 96 pages.

"3rd Generation Partnership Project; Technical Specification Group Radio Access Network; NR; Multiplexing and channel coding( Release 15)", 3GPP TS 38.212 V15.5.0, Mar. 2019, 101 pages.

"3rd Generation Partnership Project; Technical Specification Group Radio Access Network; NR; Physical layer procedures for control (Release 15)", 3GPP TS 38.213 V15.5.0, Mar. 2019, 104 pages.

"3rd Generation Partnership Project; Technical Specification Group Radio Access Network; NR; Physical layer procedures for data (Release 15)", 3GPP TS 38.214 V15.5.0, Mar. 2019, 103 pages.

International Search Report dated Apr. 3, 2020 in connection with International Patent Application No. PCT/KR2019/017209, 5 pages.

ISA/KR, International Search Report and Written Opinion of the International Searching Authority for International Application No. PCT/KR2019/004775 dated Aug. 7, 2019, 7 pages.

Ericsson, "UL MIMO procedures for codebook based transmission," R1-1711008, 3GPP TSG-RAN WG1 #89ah-NR, Qingdao, China, Jun. 27-30, 2017, 8 pages.

Mediatek Inc., "Codebook based transmission for UL," R1-1716209, 3GPP TSG RAN WG1 Meeting NR #3, Nagoya, Japan, Sep. 18-21, 2017, 23 pages.

Supplementary European Search Report dated Feb. 14, 2022, in connection with European Application No. 19893346.7, 14 pages.

Supplementary European Search Report dated Dec. 23, 2021, in connection with European Application No. 19789374.6, 9 pages.

Ericsson, "Power control for UL MIMO," R1-1805205, 3GPP TSG RAN WG1 Meeting #92bis, Sanya, China, Apr. 16-20, 2018, 8 pages.

Huawei, et al., "Possible enhancement to allow full power transmission for UL MIMO with multiple PAs," R1-1812687, 3GPP TSG RAN WG1 Meeting #95, Spokane, USA, Nov. 12-16, 2018, 5 pages.

Korean Intellectual Property Office, Office Action dated Feb. 21, 2023 regarding Application No. 10-2021-7012023, 9 pages.

* cited by examiner

UPLINK POWER CONTROL FOR ADVANCED WIRELESS COMMUNICATION SYSTEMS

CROSS-REFERENCE TO RELATED APPLICATIONS AND CLAIM OF PRIORITY

This application is a continuation of U.S. patent application Ser. No. 16/387,513, filed Apr. 17, 2019, which claims priority to: U.S. Provisional Patent Application No. 62/659,860, filed on Apr. 19, 2018; U.S. Provisional Patent Application No. 62/665,241, filed on May 1, 2018; U.S. Provisional Patent Application No. 62/674,983, filed on May 22, 2018; U.S. Provisional Patent Application No. 62/675,516 filed on May 23, 2018; and U.S. Provisional Patent Application No. 62/690,149 filed on Jun. 26, 2018. The content of the above-identified patent documents is incorporated herein by reference.

TECHNICAL FIELD

The present disclosure relates generally to power control to enable UL MIMO operation for next generation cellular systems.

BACKGROUND

Understanding and correctly estimating the UL channel between a user equipment (UE) and a gNode B (gNB) is important for efficient and effective wireless communication. In order to correctly estimate the UL channel conditions, the UE may transmit reference signal, e.g., SRS, to the gNB for UL channel measurement. With this UL channel measurement, the gNB is able to select appropriate communication parameters to efficiently and effectively perform wireless data communication with the UE in the UL.

SUMMARY

Embodiments of the present disclosure provide methods and apparatuses for power control to enable UL MIMO operation in an advanced wireless communication system.

In one embodiment, a user equipment (UE) for an uplink (UL) power control is provided. The UE includes a transceiver configured to transmit, to a base station (BS), UE capability information including a full power transmission capability of the UE, and receive, from the BS, downlink control information (DCI) including a transmit precoding matrix indicator (TPMI). The UE further includes a processor operably connected to the transceiver, the processor configured to determine a power level for each antenna port at the UE based on the full power transmission capability of the UE and the TPMI. The transceiver is further configured to transmit, to the BS, UL data via physical uplink shared channel (PUSCH) based on the determined power level for each antenna port at the UE and the TPMI where the TPMI indicates a precoding matrix and a number of layers used to transmit the UL data via the PUSCH.

In another embodiment, a base station (BS) for an uplink power control is provided. The BS includes a processor and a transceiver operably connected to the processor. The transceiver configured to receive, from a user equipment (UE), UE capability information including a full power transmission capability of the UE, transmit, to the UE, downlink control information (DCI) including a transmit precoding matrix indicator (TPMI), and receive, from the UE, UL data via physical uplink shared channel (PUSCH) based on a power level for each antenna port at the UE and the TPMI where the TPMI indicates a precoding matrix and a number of layers used to transmit the UL data via the PUSCH, and the power level for each antenna port at the UE is determined based on the full power transmission capability of the UE and the TPMI.

In yet another embodiment, a method of a user equipment (UE) for an uplink power control is provided. The method comprises transmitting, to a base station (BS), UE capability information including a full power transmission capability of the UE, receiving, from the BS, downlink control information (DCI) including a transmit precoding matrix indicator (TPMI), determining a power level for each antenna port at the UE based on the full power transmission capability of the UE and the TPMI, and transmitting, to the BS, UL data via physical uplink shared channel (PUSCH) based on the determined power level for each antenna port at the UE and the TPMI wherein the TPMI indicates a precoding matrix and a number of layers used to transmit the UL data via the PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
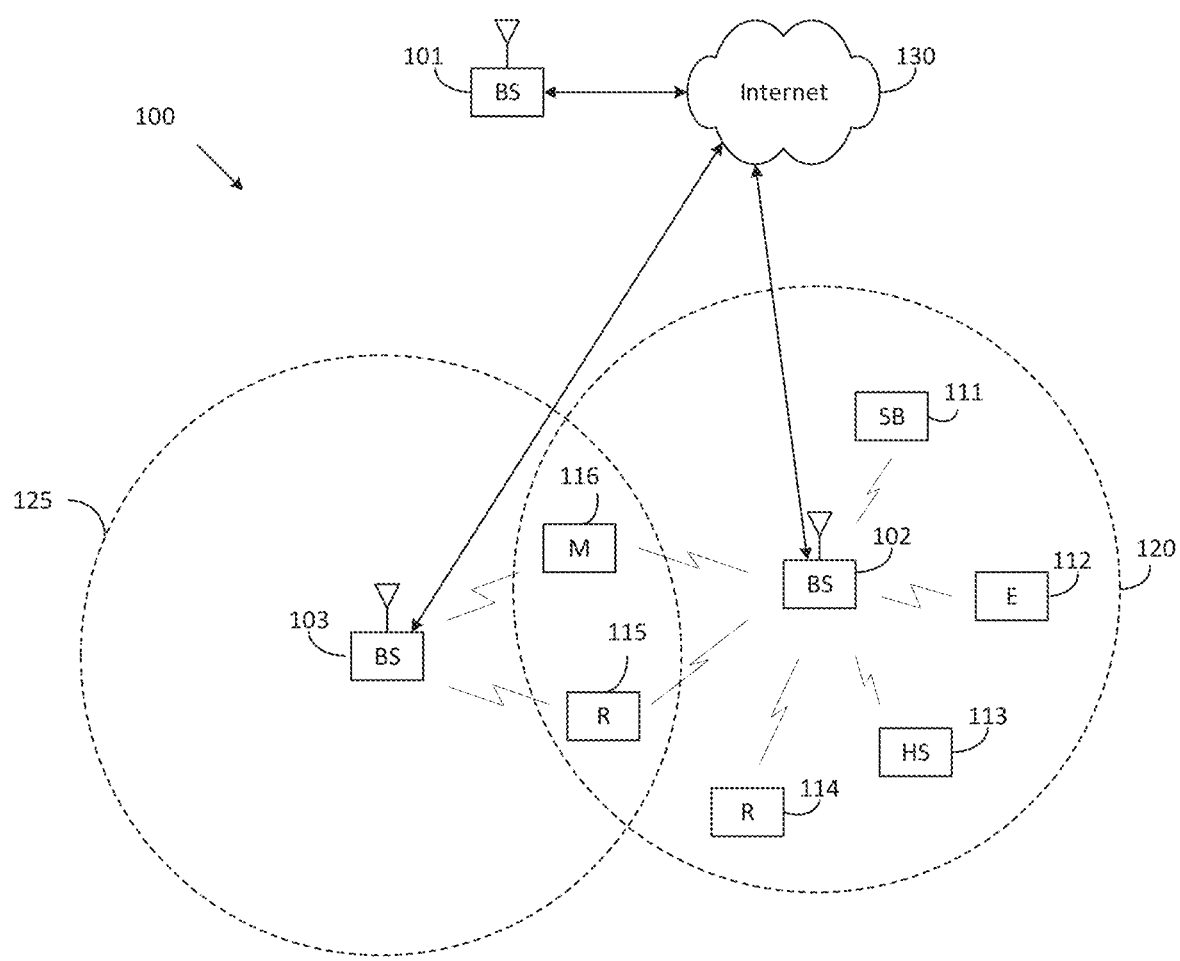
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.5.0, "E-UTRA, Physical channels and modulation;" 3GPP TS 36.212 v15.5.0, "E-UTRA, Multiplexing and Channel coding;" 3GPP TS 36.213 v15.5.0, "E-UTRA, Physical Layer Procedures;" 3GPP TS 36.321 v15.5.0, "E-UTRA, Medium Access Control (MAC) protocol specification;" 3GPP TS 36.331 v15.5.0, "E-UTRA, Radio Resource Control (RRC) protocol specification;" 3GPP TR 22.891 v14.2.0; 3GPP TS 38.211 v15.5.0, "E-UTRA, NR, Physical channels and modulation;" 3GPP TS 38.213 v15.5.0, "E-UTRA, NR, Physical Layer Procedures for control;" and 3GPP TS 38.214 v15.5.0, "E-UTRA, NR, Physical layer procedures for data;" and 3GPP TS 38.212 v15.5.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
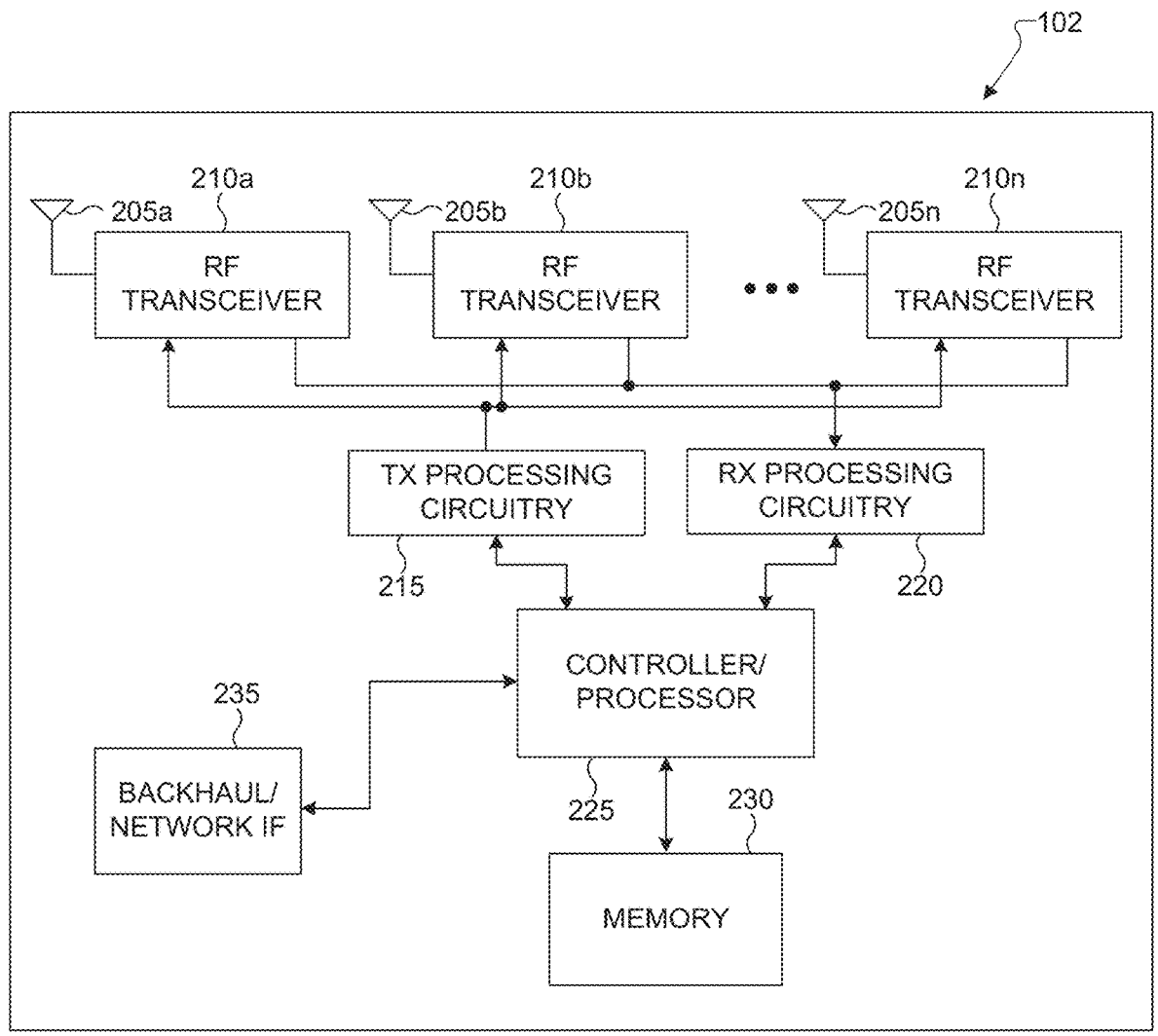
FIG. 2 illustrates an example gNB according to embodiments of the present disclosure.
Figure 3:
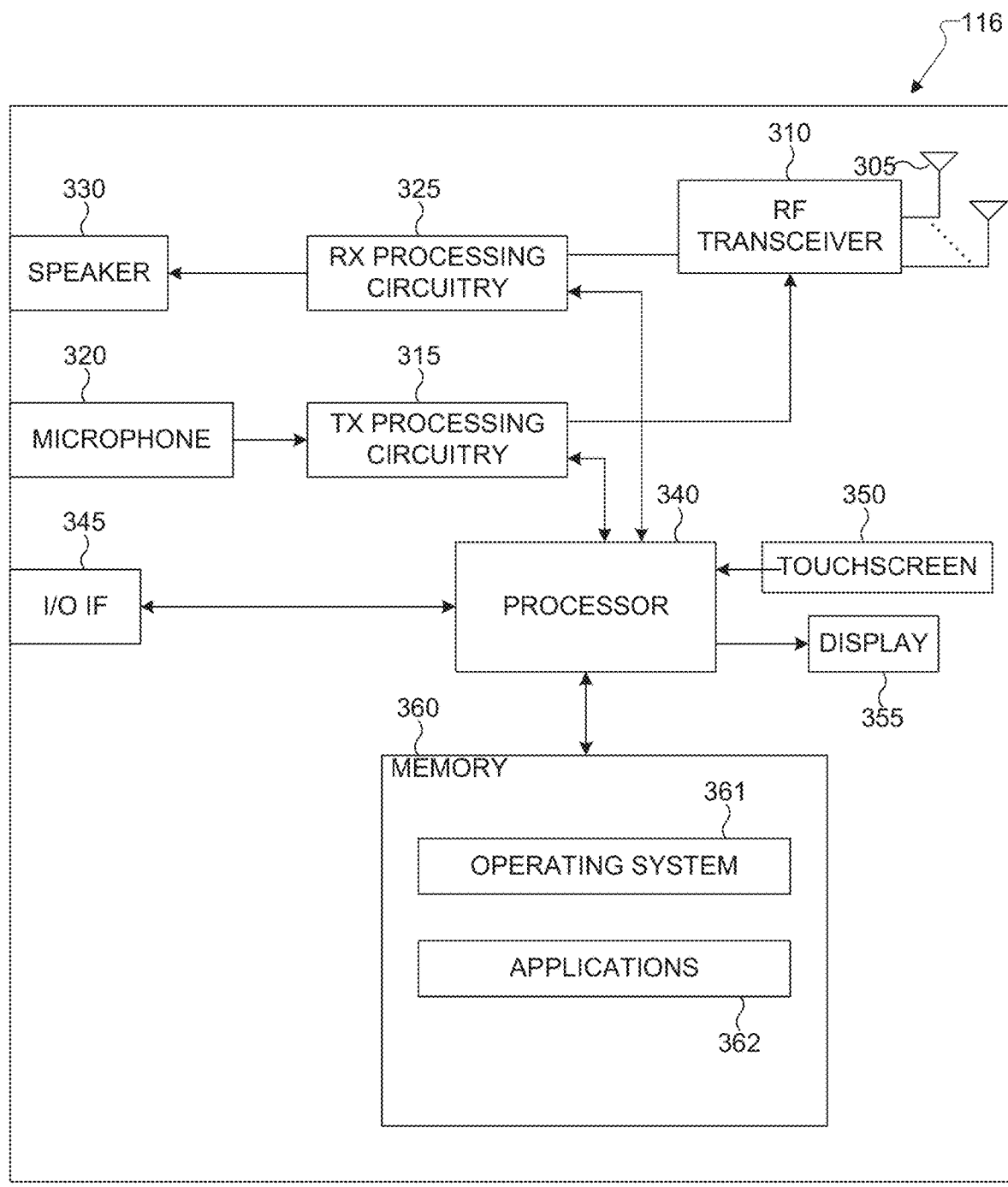
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient uplink power control in an advanced wireless communication system. In certain embodiments, and one or more of the gNBs 101-103 includes circuitry, programing, or a combination thereof, to facilitate efficient uplink power control in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
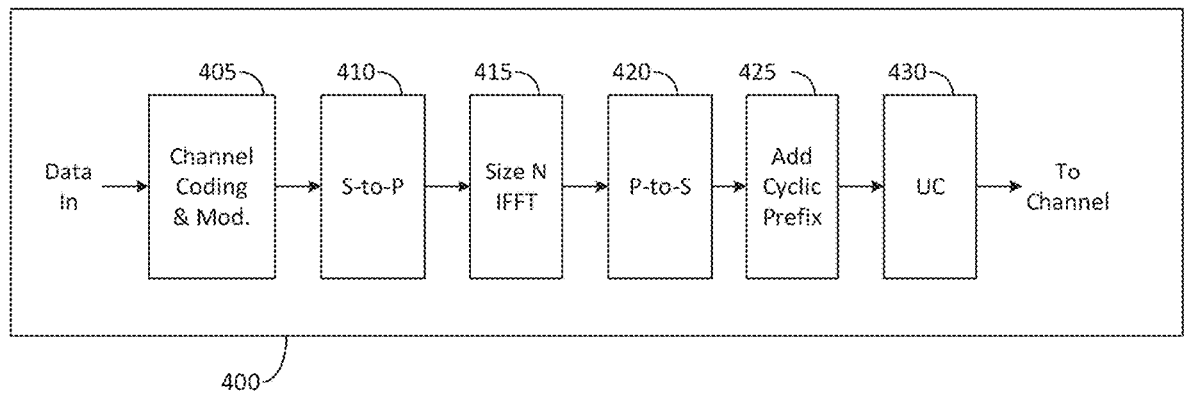
FIG. 4A illustrates a high-level diagram of an orthogonal frequency division multiple access transmit path according to embodiments of the present disclosure.
Figure 4B:
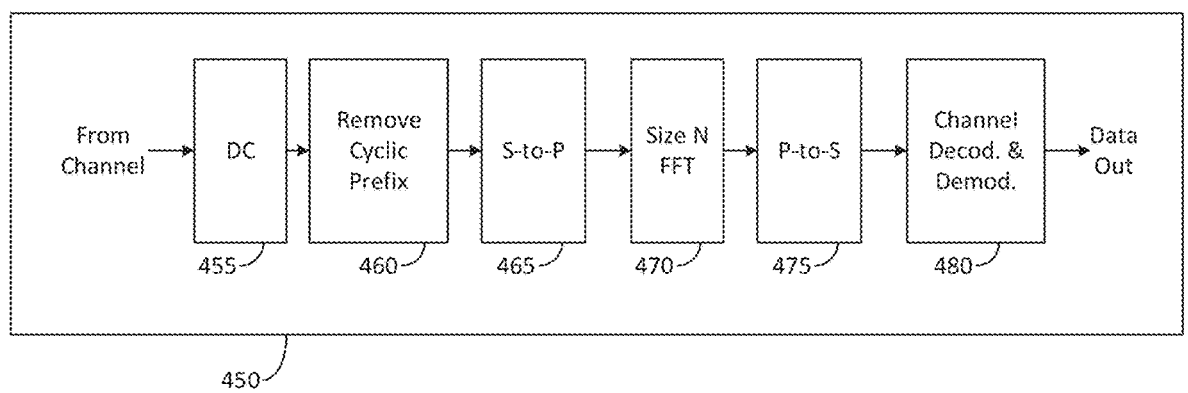
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
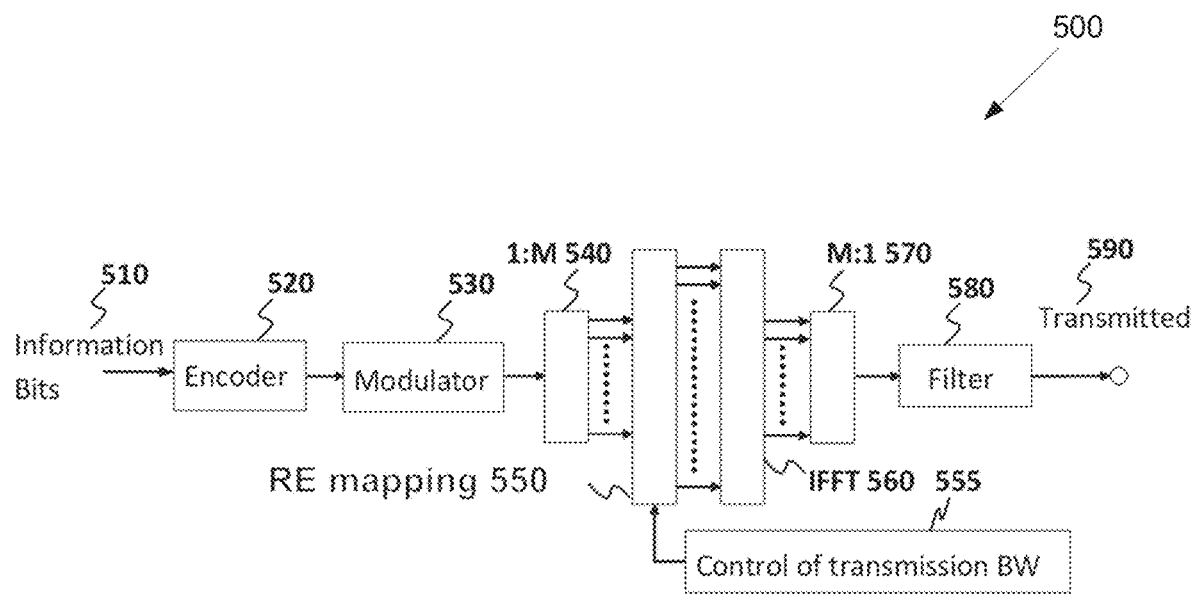
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
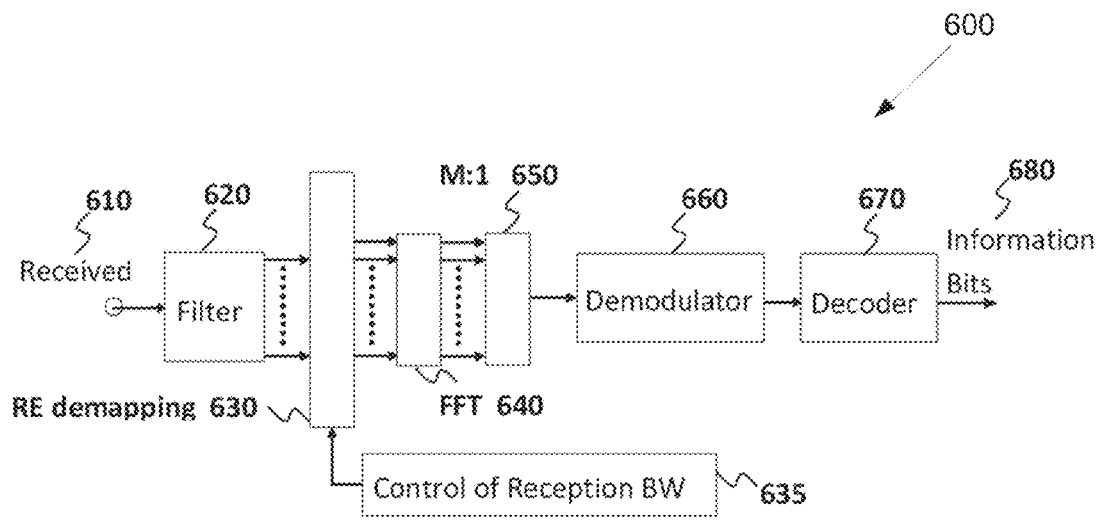
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
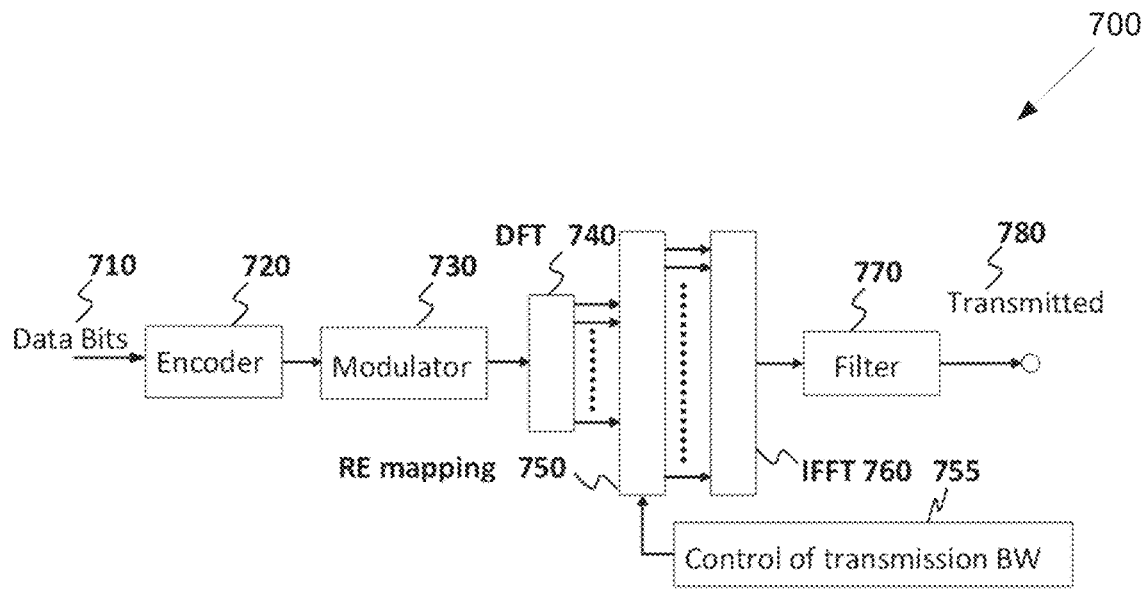
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
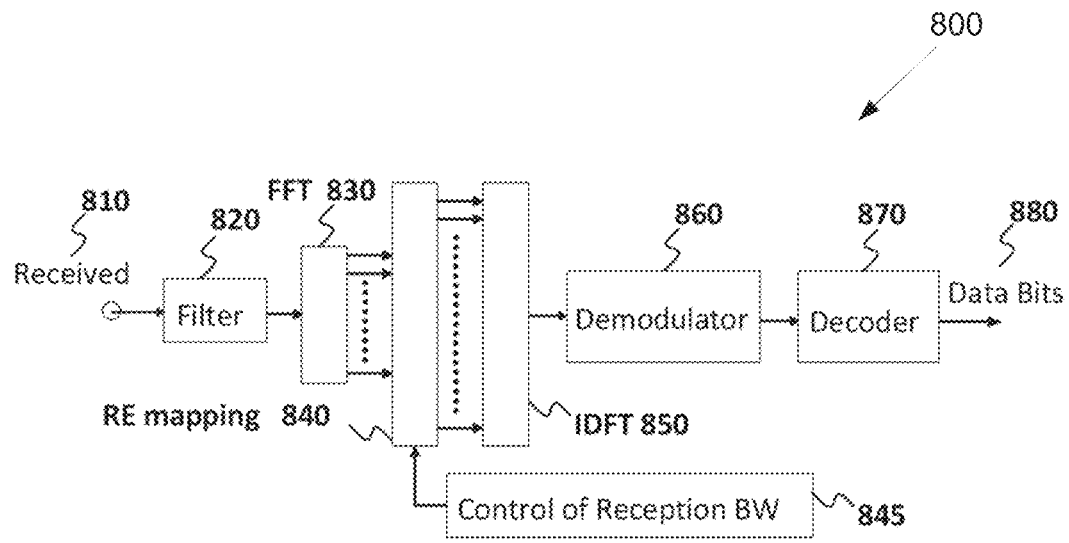
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
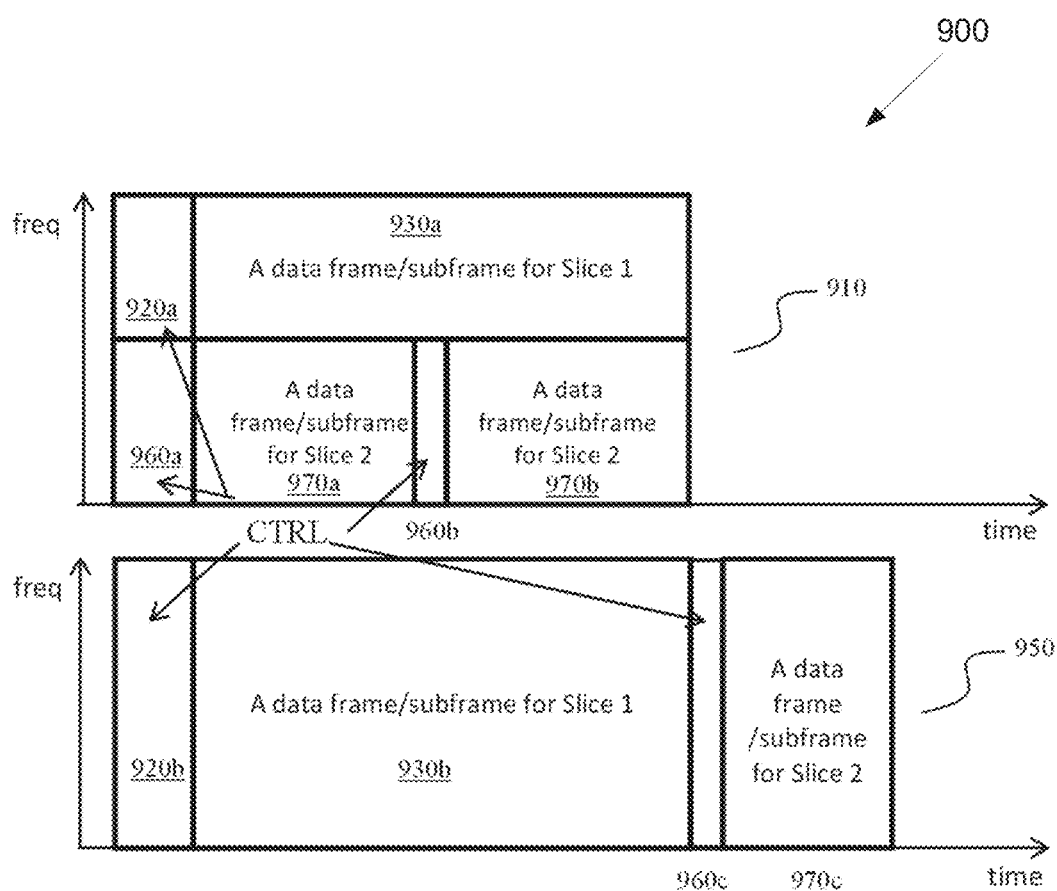
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
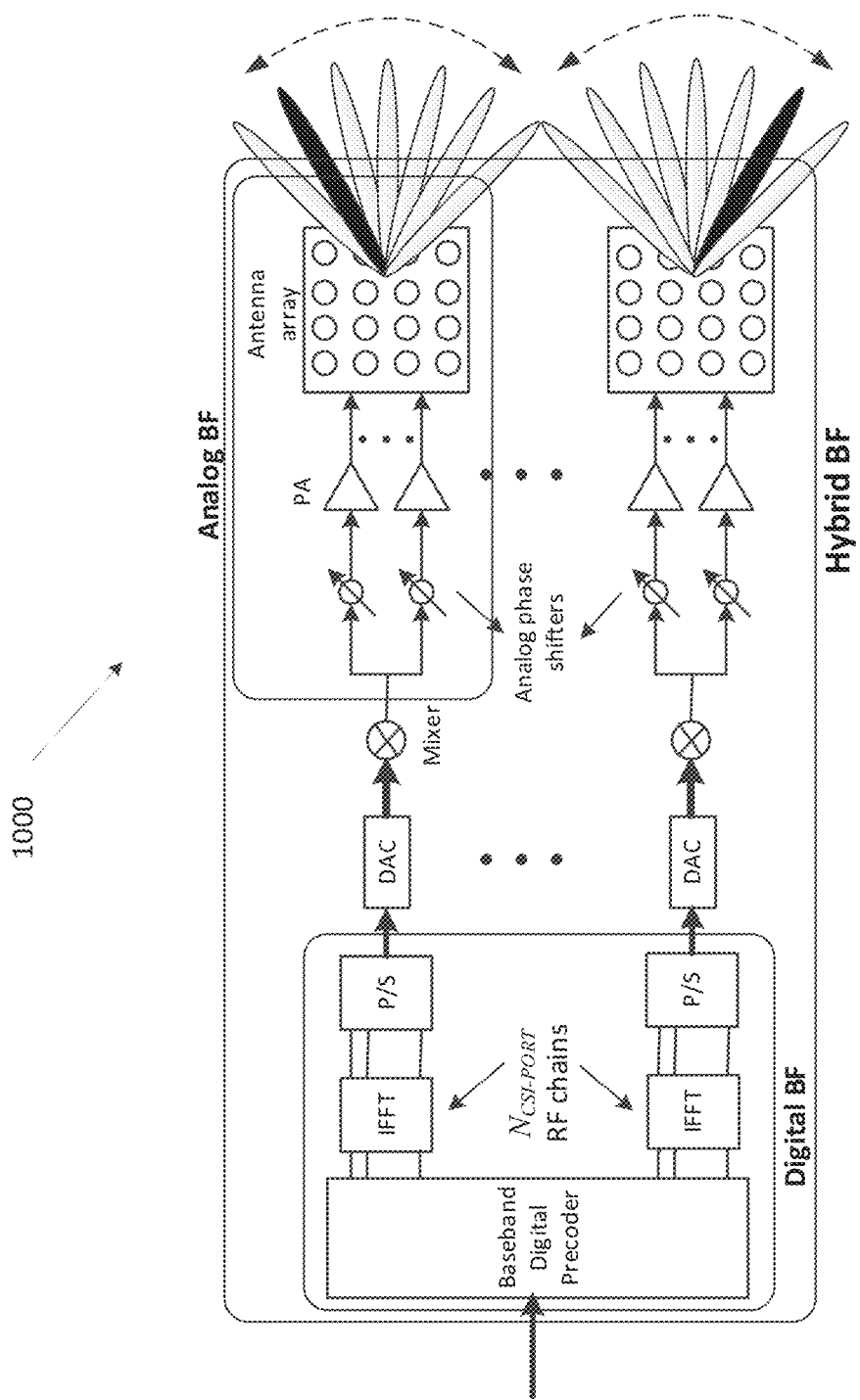
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
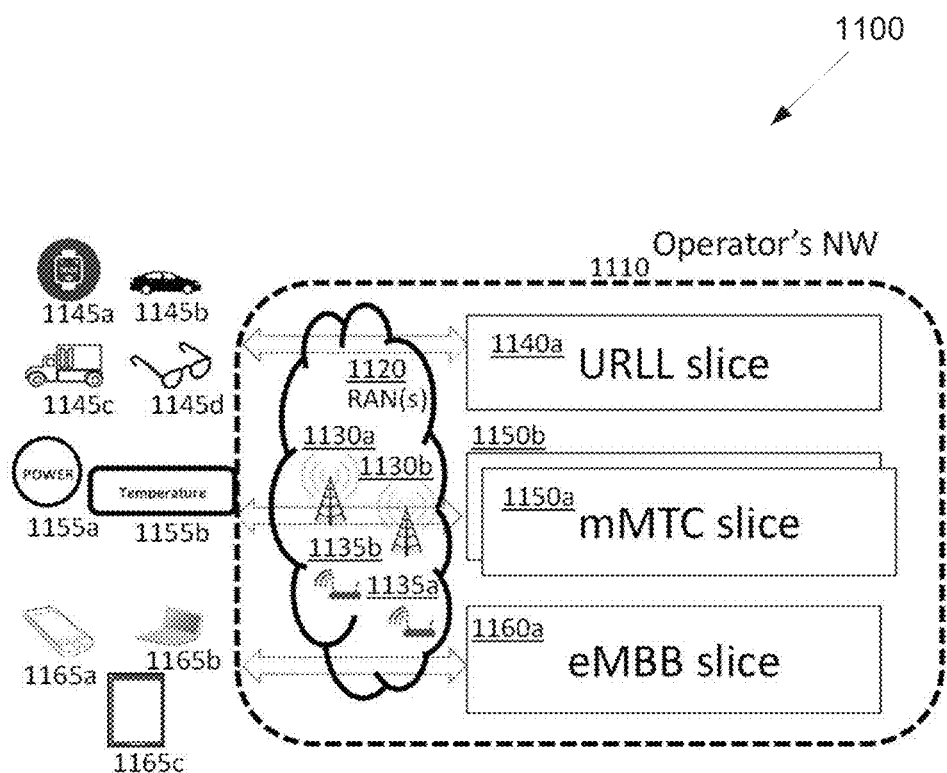
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small.

When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In 3GPP LTE specification, UL SU-MIMO transmission is supported using a codebook-based transmission scheme. That is, an UL grant (containing DCI format 4) includes a single PMI field (along with RI) which indicates the single precoding vector or matrix (from a predefined codebook) a UE shall use for the scheduled UL transmission. Therefore, when multiple PRBs are allocated to the UE, a single precoding matrix indicated by the PMI implies that wideband UL precoding is utilized.

Despite its simplicity, this is clearly sub-optimal since typical UL channel is frequency-selective and a UE is frequency scheduled to transmit using multiple PRBs. Yet another drawback of Rel. 10 LTE UL SU-MIMO is its lack of support for scenarios where accurate UL-CSI is unavailable at the eNB (which is essential for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO should offer competitive performance even when accurate UL-CSI is unavailable at the eNB. Third, the proposed UL MIMO solution should be able to exploit UL-DL reciprocity where CSI-RS is utilized by the UE to provide UL-CSI estimation for TDD scenarios. Additional examples of such efficient UL MIMO operations and components are described in U.S. patent application Ser. No. 15/491,927, filed Apr. 19, 2017 and entitled "Method and Apparatus for Enabling Uplink MIMO," which is incorporated by reference herein in its entirety.

In 3GPP LTE UL codebook, pre-coders with antenna selection has been supported in order to keep peak-to-average power ratio (PAPR) low and cubic-metric (CM) for rank>1 small. Antenna selection offers performance improvement in some scenarios, especially for SC-FDMA based UL in LTE. However, for 5G NR systems, it has been agreed in 3GPP RAN1 that UL is primarily going to be CP-OFDM based, although SC-FDMA based will also be supported. It is unclear that antenna selection will show any performance gain in case of CP-OFDM based UL. Whether antenna selection is considered or not, there are several alternatives for UL codebook in 5G NR. In addition, the UL codebook design is also dependent on whether or not the UE is capable to transmit UL data (PUSCH) using all of, or a subset of antenna ports. For example, the UE can be capable of at least one of full-coherent (all antenna ports), partial-coherent (a subset of antenna ports), or non-coherent UL transmission (a single antenna port) to transmit a layer in UL. The 5G NR UL codebook has been designed keeping this UE coherence capability in mind. However, if there are some issues (as explained later) with UL power control if UL power control similar to LTE is applied. This disclosure address a few example embodiments for the UL power control to overcome these issues.

In 3GPP NR, the UL transmission is configured to be either codebook-based or non-codebook-based via higher layer parameter txConfig in PUSCH-Config set to either "codebook" or "nonCodebook."

According to 3GPP NR specification, the following is supported for codebook based UL transmission. For codebook based transmission, the UE determines the UE's codebook subsets based on TPMI and upon the reception of higher layer parameter ULCodebookSubset or codebookSubset in PUSCH-Config which may be configured with "fullAndPartialAndNonCoherent," or "partialAndNonCoherent," or "nonCoherent" depending on the UE capability. The maximum transmission rank may be configured by the higher parameter ULmaxRank or maxRank in PUSCH-Config.

A UE reporting the UE's UE capability of "partialAndNonCoherent" transmission may not expect to be configured by ULCodebookSubset with "fullAndPartialAndNonCoherent."

A UE reporting the UE's UE capability of "Non-Coherent" transmission may not expect to be configured by ULCodebookSubset with "fullAndPartialAndNonCoherent" or with "partialAndNonCoherent."

A UE may not expect to be configured with the higher layer parameter ULCodebookSubset set to "partialAndNonCoherent" when two antenna ports are configured.

In the present disclosure, "fullAndPartialAndNonCoherent," "partialAndNonCoherent," and "Non-Coherent" are referred to as the three examples of coherence type/capability, where the term "coherence" implies a subset of antenna ports at the UE that can be used to transmit a layer of UL data coherently.

According to NR specification, for non-codebook-based UL transmission, the precoding matrix w equals the identity matrix. For codebook-based UL transmission, the precoding matrix w is given by w=1 for single-layer transmission on a single antenna port, otherwise by TABLE 1 to TABLE 6.

The subset of TPMI indices for the three coherence types are summarized in TABLE 7 and TABLE 8 where rank=r corresponds to (and is equivalent to) r layers.

The rank (or number of layers) and the corresponding precoding matrix w are indicated to the UE using TRI and TPMI, respectively. In one example, this indication is joint via a field "Precoding information and number of layers" in DCI, e.g., using DCI format 0_1. In another example, this indication is via higher layer RRC signaling. In one example, the mapping between a field "Precoding information and number of layers" and TRI/TPMI is according to NR.

TABLE 1

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Precoding matrix W for single-layer transmission using two antenna ports

TABLE 2

Precoding matrix W for single-layer transmission using four antenna ports with transform precoding disabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 3

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

TABLE 4

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |

TABLE 4-continued

Precoding matrix W for two-layer transmission using four antenna ports with transform precoding disabled.

| TPMI index | W (ordered from left to right in increasing order of TPMI index) | | | |
|---|---|---|---|---|
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE 5

Precoding matrix W for three-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 6

Precoding matrix W for four-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

TABLE 7

TPMI indices for 2 antenna ports

| Rank | Non-coherent | fullAndPartialAndNonCoherent |
|---|---|---|
| 1 | 0-1 | 0-5 |
| 2 | 0 | 0-2 |

TABLE 8

TPMI indices for 4 antenna ports

| Rank | Non-coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

TABLE 9

Total power of precoding matrix w for 2 antenna ports

|  | Non-Coherent TPMIs | | Full-Coherent TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 10

Total power of precoding matrix w for 4 antenna ports

|  | Non-Coherent TPMIs | | Partial-Coherent TPMIs | | Full-Coherent TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The total power of the pre-coding matrix w for different rank and coherence types is summarized in TABLE 9 and TABLE 10. The following issues can be observed.

In one issue, for non-coherent and partial-coherent TPMIs, total power increases as rank increases, which implies that the TPMI selection will be biased to higher rank. In particular, even for cell-edge UEs, rank 1 TPMI may not be selected, which can severely affect cell-edge performance.

In another issue, for a given rank, total power of non-coherent TPMIs≤total power of partial-coherent TPMIs≤total power of full-coherent TPMIs. The reason for this trend is that the power of non-zero antenna ports does not change across three types of TPMIs. This may be beneficial in some scenarios, for example, UE implementation for power saving. However, this may not be desired always.

The aforementioned issues can be handled by UL power control. The present disclosure provides some examples and embodiments. The scope of the present disclosure does not limit to only these embodiments, but includes any extensions or combinations of the provided embodiments.

In one embodiment 1, for PUSCH, a UE first scales a linear value $\hat{P}_{PUSCH,f,c}(i, j, q_d, l)$ of the transmit power $P_{PUSCH,f,c}(i, j, q_d, l)$ on UL bandwidth part (BWP) b of carrier f of serving cell c, by β and the resulting scaled power is then split equally across the antenna ports on which the non-zero PUSCH is transmitted. At least one of the following alternatives is used to determine β. In one example of Alt 1-1, β=1. In another example of Alt 1-2, $$\beta = \frac{\rho_0}{\rho}.$$

In yet another example of Alt 1-3, $$\beta = \min\left(1, K\frac{\rho_0}{\rho}\right).$$

In such examples, ρ is the number of antenna ports $\{p_0 \ldots, p_{\rho-1}\}$ or the number of configured antenna ports for the transmission scheme or the maximum number of SRS ports supported by the UE in one SRS resource. In such examples, $\rho_0$ is the number of non-zero antenna ports $\{p_0 \ldots p_{\rho-1}\}$ or the number of antenna ports with a non-zero PUSCH transmission power, and K is an integer and belongs to $\{1, 2, \ldots \rho\}$.

An example to determine K value is K=$2^i$, where i=0, 1, ..., $\log_2 \rho$: for ρ=1 (1 antenna port), K=1; for ρ=2 (2 antenna ports), K=1 or 2; and for ρ=4 (4 antenna ports), K=1 or 2 or 4.

Another example to determine K value is as follows: for non-codebook based UL transmission K=1; and for codebook-based UL transmission K is given from TABLE 11.

TABLE 11

Example of K value

| ULCodebookSubset or UE coherence type/capability | Number of antenna ports | K |
|---|---|---|
| fullAndPartialAndNonCoherent | 2 | 1 |
| fullAndPartialAndNonCoherent | 4 | 1 |
| partialAndNonCoherent | 4 | 2 |
| noncoherent | 2 | 2 |
| noncoherent | 4 | 4 |

The β value according to Alt 1-3 and K value as in TABLE 11 is summarized in TABLE 12 and TABLE 13. Note that for 4 antenna ports, the value for coherence type=partialAndNonCoherent (PC+NC), rank 2 and rank 3, and non-coherent (NC) TPMIs is 1, which implies that power per non-zero (NZ) port is ½ and ⅓ for rank 2 and rank 3, respectively. This is different from the power per NZ port ¼ for rank 2 and rank 3 and partial-coherent TPMIs. That is, the power per NZ port changes across rank 2 and rank 3 TPMIs.

TABLE 12

β value according to Alt 1-3 and for 2 antenna ports.

| | | Non-Coherent TPMIs | | | | Full-Coherent TPMIs | | | |
|---|---|---|---|---|---|---|---|---|---|
| Coherence type | Rank | TPMI indices | K | α | β | TPMI indices | K | α | β |
| NC | 1 | 0-1 | 2 | 1 | 1 | | | | |
|  | 2 | 0 | 2 | 2 | 1 | | | | |
| FC + PC + NC | 1 | 0-1 | 1 | ½ | ½ | 2-5 | 1 | 1 | 1 |
|  | 2 | 0 | 1 | 1 | 1 | 1-2 | 1 | 1 | 1 |

TABLE 13

β value according to Alt 1-3 and K value as in TABLE 11 for 4 antenna ports.

| Coherence type | Rank | Non-Coherent TPMIs | | | | Partial-Coherent TPMIs | | | | Full-Coherent TPMIs | | | |
|---|---|---|---|---|---|---|---|---|---|---|---|---|---|
| | | TPMI indices | K | α | β | TPMI indices | K | α | β | TPMI indices | K | α | β |
| NC | 1 | 0-3 | 4 | 1 | 1 | | | | | | | | |
| | 2 | 0-5 | 4 | 2 | 1 | | | | | | | | |
| | 3 | 0 | 4 | 3 | 1 | | | | | | | | |
| | 4 | 0 | 4 | 4 | 1 | | | | | | | | |
| PC + NC | 1 | 0-3 | 2 | ½ | ½ | 4-11 | 2 | 1 | 1 | | | | |
| | 2 | 0-5 | 2 | 1 | 1 | 6-13 | 2 | 2 | 1 | | | | |
| | 3 | 0 | 2 | 3/2 | 1 | 1-2 | 2 | 2 | 1 | | | | |
| | 4 | 0 | 2 | 2 | 1 | 1-2 | 2 | 2 | 1 | | | | |
| FC + PC + NC | 1 | 0-3 | 1 | ¼ | ¼ | 4-11 | 1 | ½ | ½ | 12-27 | 1 | 1 | 1 |
| | 2 | 0-5 | 1 | ½ | ½ | 6-13 | 1 | 1 | 1 | 14-21 | 1 | 1 | 1 |
| | 3 | 0 | 1 | ¾ | ¾ | 1-2 | 1 | 1 | 1 | 3-6 | 1 | 1 | 1 |
| | 4 | 0 | 1 | 1 | 1 | 1-2 | 1 | 1 | 1 | 3-4 | 1 | 1 | 1 |

In one sub-embodiment 1-1, only one alternative (e.g., Alt 1-1 or Alt 1-2) for β is supported in the specification.

In one sub-embodiment 1-2, multiple alternatives for β are supported in the specification. One of the multiple values is either configured via higher layer (RRC) or more dynamic MAC CE based or DCI based signaling. If configured via RRC signaling, the configuration can be implicit based in the RRC parameter ULCodebookSubset or/and ULmaxRank. Alternatively, a preferred value is reported by the UE. This reporting can be a part of UE capability. For instance, the UE can report a preferred value when the UE reports the UE's coherence capability.

In one embodiment 2, for PUSCH, a UE first scales a linear value $\hat{P}_{PUSCH,f,c}(i, j, q_d, l)$ of the transmit power $P_{PUSCH,f,c}(i, j, q_d, l)$ on UL BWP b of carrier f of serving cell, by β and the resulting scaled power is then split equally across the antenna ports on which the non-zero PUSCH is transmitted, where the β value is determined based on whether the TPMI coherence type is "fullAndPartialAndNonCoherent" or "partialAndNonCoherent" or "partialAndNonCoherent."

In one sub-embodiment 2-1, $$\beta = \frac{\rho_0}{\rho}$$

(e.g., Alt 1-2) if either higher layer (RRC) parameter ULCodebookSubset="fullAndPartialAndNonCoherent" or the UE reports the UE's UE capability of "fullAndPartialAndNonCoherent," and β=1 (e.g., Alt 1-1) otherwise.

In one sub-embodiment 2-2, $$\beta = \frac{\rho_0}{\rho}$$

(e.g., Alt 1-2) if either higher layer (RRC) parameter ULCodebookSubset="fullAndPartialAndNonCoherent" or "partialAndNonCoherent" or the UE reports the UE's UE capability of "fullAndPartialAndNonCoherent" or "partialAndNonCoherent," and β=1 (Alt 1-1) otherwise.

In one sub-embodiment 2-3, $$\beta = \min\left(1, K\frac{\rho_0}{\rho}\right)$$

(e.g., Alt 1-3) if either higher layer (RRC) parameter ULCodebookSubset="fullAndPartialAndNonCoherent" or the UE reports the UE's UE capability of "fullAndPartialAndNonCoherent," and β=1 (e.g., Alt 1-1) otherwise.

In one sub-embodiment 2-4, $$\beta = \min\left(1, K\frac{\rho_0}{\rho}\right)$$

(Alt 1-3) if either higher layer (RRC) parameter ULCodebookSubset="fullAndPartialAndNonCoherent" or "partialAndNonCoherent" or the UE reports the UE's UE capability of "fullAndPartialAndNonCoherent" or "partialAndNonCoherent," and β=1 (Alt 1-1) otherwise.

In one sub-embodiment 2-5, $$\beta = \min\left(1, K\frac{\rho_0}{\rho}\right)$$

(Alt 1-3) if either higher layer (RRC) parameter ULCodebookSubset="fullAndPartialAndNonCoherent" or the UE reports the UE's UE capability of "fullAndPartialAndNonCoherent," and $$\beta = \frac{\rho_0}{\rho}$$

(Alt 1-2) otherwise.

In one sub-embodiment 2-6, $$\beta = \min\left(1, K\frac{\rho_0}{\rho}\right)$$

(Alt 1-3) if either higher layer (RRC) parameter ULCodebookSubset="fullAndPartialAndNonCoherent" or "partialAndNonCoherent" or the UE reports the UE's UE capability of "fullAndPartialAndNonCoherent" or "partialAndNonCoherent," and $$\beta = \frac{\rho_0}{\rho}$$

(Alt 1-2) otherwise.

In one embodiment 3, for PUSCH, a UE first scales a linear value $\hat{P}_{PUSCH,f,c}(i, j, q_d, l)$ of the transmit power $P_{PUSCH,f,c}(i, j, q_d, l)$ on UL BWP b of carrier f of serving cell c, by $\beta$ and the resulting scaled power is then split equally across the antenna ports on which the non-zero PUSCH is transmitted, where the $\beta$ value is determined depending on the number of coherent antenna port groups (G) and rank. At least one of the following alternatives is used to determine $\beta$.

In one example of Alt 3-1, $$\beta = \frac{\sum_{g=0}^{G-1} \rho_{0,g}}{\rho}.$$

In one example of Alt 3-2, $\beta=\beta_1\beta_2$, where $$\beta_1 = \frac{1}{G_0}$$

scales the transmit power equally across the coherent antenna port groups on which the non-zero PUSCH is transmitted, and $$\beta_2 = \sum_{g=0}^{G-1} \frac{\rho_{0,g}}{\rho_g}.$$

Note that G is equivalent to K in Alt 1-3 (embodiment 1) and $$\rho_g = \frac{\rho}{G}$$

if the number of configured antenna ports ($\rho$) is divided equally into G coherent port groups, and then $$\beta_2 = G\frac{\sum_{g=0}^{G-1} \rho_{0,g}}{\rho} = G\frac{\rho_0}{\rho} = K\frac{\rho_0}{\rho}.$$

In one example of Alt 3-3, $\beta=\beta_1\beta_2$, where $$\beta_1 = \frac{G}{G_0} \text{ and } \beta_2 = \frac{\rho_0}{\rho}.$$

In one example of Alt 3-4, $\beta=\beta_1/\beta_2$, where $$\beta_1 = \frac{G_0}{G} \text{ and } \beta_2 = \frac{\rho}{\rho_0}.$$

In one example of Alt 3-5, $\beta=\beta_1/\beta_2$, where $$\beta_2 = \frac{G_0}{G} \text{ and } \beta_1 = \frac{\rho_0}{\rho}.$$

In one example of Alt 3-6, $=\beta_1\beta_2$, where $$\beta_1 = \max\left(1, \frac{G}{R}\right) \text{ and } \beta_2 = \frac{\rho_0}{\rho}.$$

In such examples: G is the number of coherent antenna port groups; $G_0$ is the number of coherent antenna port groups on which the non-zero PUSCH is transmitted; $\rho_g$ is the number of configured antenna ports for the transmission scheme in the g-th coherent antenna port group; $\rho_{0,g}$ is the number of antenna ports with a non-zero PUSCH transmission in the g-th coherent antenna port group; and R is the number of layers (or rank value).

In one example, the G value according to Alt 3-6 is given by G=K in TABLE 11. In one example, the $G_0$ value according to Alt 3-2 is given by TABLE 14.

TABLE 14

$G_0$ value according to Alt 3-2

| ULCodebookSubset | Number of antenna ports | $G_0$ for rank 1 | $G_0$ for rank 2 | $G_0$ for rank 3 | $G_0$ for rank 4 |
|---|---|---|---|---|---|
| fullAndPartialAndNonCoherent | 2 | 1 | 1 | | |
| fullAndPartialAndNonCoherent | 4 | 1 | 1 | 1 | 1 |
| partialCoherent | 4 | 1 | 2 | 2 | 2 |
| noncoherent | 2 | 1 | 2 | | |
| noncoherent | 4 | 1 | 2 | 3 | 4 |

In one example, the $\beta_1$ value according to Alt 3-3 is given by TABLE 15, where the $G_0$ value is according to TABLE 14 and G=K according to TABLE 11.

TABLE 15

$\beta_1$ value according to Alt 3-3

| ULCodebookSubset | Number of antenna ports | $\beta_1$ for rank 1 | $\beta_1$ for rank 2 | $\beta_1$ for rank 3 | $\beta_1$ for rank 4 |
|---|---|---|---|---|---|
| fullAndPartialAndNonCoherent | 2 | 1 | 1 | | |
| fullAndPartialAndNonCoherent | 4 | 1 | 1 | 1 | 1 |
| partialCoherent | 4 | 2 | 1 | 1 | 1 |
| noncoherent | 2 | 2 | 1 | | |
| noncoherent | 4 | 4 | 2 | 4/3 | 1 |

In an example, for non-codebook based UL transmission G=the number of configured antenna ports for the UL transmission scheme, and for codebook-based UL transmission, the number of coherent antenna port groups (G) for the three coherence types are as shown in TABLE 16.

TABLE 16

Number of coherent antenna port groups (G)

| Coherence type | Number of antenna ports = 2 | Number of antenna ports = 4 |
| --- | --- | --- |
| noncoherent | 2 | 4 |
| partialAndNonCoherent |  | 2 |
| fullAndPartialAndNonCoherent | 1 | 1 |

In another example, for a given number of antenna ports, the value for non-codebook based UL transmission is the same as that for codebook based UL transmission with NC coherence type.

For codebook based UL transmission, the value according to Alt 3-2 is summarized in TABLE 17 and TABLE 18. The corresponding power per non-zero antenna port is summarized in TABLE 19 and TABLE 20. Note that for 4 antenna ports: the value for coherence type=partialAndNonCoherent, rank 2, and non-coherent TPMIs is either 1 (for TPMI indices=1, 4) or ½ 1 (for TPMI indices=0, 2, 3, 5); for a given rank, the power per non-zero antenna port does not change except for coherence type=partialAndNonCoherent, rank 2, and non-coherent TPMIs; the power per non-zero antenna port does change across rank; the power per non-zero antenna port does change across rank for coherence type=nonCoherent and partialAndNonCoherent; and for all rank, the power per non-zero antenna port does not change for coherent type=fullAndPartialAndNonCoherent (FC+PC+NC).

The $\beta$ value according to other alternatives such as Alt 3-3, 3-4, or 3-5 can be constructed similarly.

TABLE 17

$\beta$ value according to Alt 3-2 and for 2 antenna ports

| Coherence type | Rank | Non-Coherent TPMIs TPMI indices | $\beta_1$ | $\beta_2$ | $\beta$ | Full-Coherent TPMIs TPMI indices | $\beta_1$ | $\beta_2$ | $\beta$ |
| --- | --- | --- | --- | --- | --- | --- | --- | --- | --- |
| NC | 1 | 0-1 | 1 | 1 | 1 |  |  |  |  |
|  | 2 | 0 | ½ | 2 | 1 |  |  |  |  |
| FC + PC + NC | 1 | 0-1 | 1 | ½ | ½ | 2-5 | 1 | 1 | 1 |
|  | 2 | 0 | 1 | 1 | 1 | 1-2 | 1 | 1 | 1 |

TABLE 18

$\beta$ value according to Alt 3-2 and for 4 antenna ports

| Coherence type | Rank | Non-Coherent TPMIs TPMI indices | $\beta_1$ | $\beta_2$ | $\beta$ | Partial-Coherent TPMIs TPMI indices | $\beta_1$ | $\beta_2$ | $\beta$ | Full-Coherent TPMIs TPMI indices | $\beta_1$ | $\beta_2$ | $\beta$ |
| --- | --- | --- | --- | --- | --- | --- | --- | --- | --- | --- | --- | --- | --- |
| NC | 1 | 0-3 | 1 | 1 | 1 |  |  |  |  |  |  |  |  |
|  | 2 | 0-5 | ½ | 2 | 1 |  |  |  |  |  |  |  |  |
|  | 3 | 0 | ⅓ | 3 | 1 |  |  |  |  |  |  |  |  |
|  | 4 | 0 | ¼ | 4 | 1 |  |  |  |  |  |  |  |  |
| PC + NC | 1 | 0-3 | 1 | ½ | ½ | 4-11 | 1 | 1 | 1 |  |  |  |  |
|  | 2 | 0, 2, 3, 5 | ½ | 1 | ½ | 6-13 | ½ | 2 | 1 |  |  |  |  |
|  |  | 1, 4 | 1 | 1 | 1 |  |  |  |  |  |  |  |  |
|  | 3 | 0 | ½ | 3/2 | ¾ | 1-2 | ½ | 2 | 1 |  |  |  |  |
|  | 4 | 0 | ½ | 2 | 1 | 1-2 | ½ | 2 | 1 |  |  |  |  |
| FC + PC + NC | 1 | 0-3 | 1 | ¼ | ¼ | 4-11 | 1 | ½ | ½ | 12-27 | 1 | 1 | 1 |
|  | 2 | 0-5 | 1 | ½ | ½ | 6-13 | 1 | 1 | 1 | 14-21 | 1 | 1 | 1 |
|  | 3 | 0 | 1 | ¾ | ¾ | 1-2 | 1 | 1 | 1 | 3-6 | 1 | 1 | 1 |
|  | 4 | 0 | 1 | 1 | 1 | 1-2 | 1 | 1 | 1 | 3-4 | 1 | 1 | 1 |

TABLE 19

Power per non-zero antenna port according to Alt 3-2 and for 2 antenna ports

| Coherence type | Rank | Non-Coherent TPMIs TPMI indices | $\beta$ | # non-zero ports (n) | Power/non-zero port ($\beta/n$) | Full-Coherent TPMIs TPMI indices | $\beta$ | # non-zero ports (n) | Power/non-zero port ($\beta/n$) |
| --- | --- | --- | --- | --- | --- | --- | --- | --- | --- |
| NC | 1 | 0-1 | 1 | 1 | 1 |  |  |  |  |
|  | 2 | 0 | 1 | 2 | ½ |  |  |  |  |
| FC + PC + NC | 1 | 0-1 | ½ | 1 | ½ | 2-5 | 1 | 2 | ½ |
|  | 2 | 0 | 1 | 2 | ½ | 1-2 | 1 | 2 | ½ |

TABLE 20

Power per non-zero antenna port according to Alt 3-2 and for 4 antenna ports

| Coherence type | Rank | Non-Coherent TPMIs ||||| Partial-Coherent TPMIs ||||| Full-Coherent TPMIs |||||
|---|---|---|---|---|---|---|---|---|---|---|---|---|---|---|
| | | TPMI indices | $\beta$ | # non-zero ports (n) | Power/non-zero port ($\beta$/n) | TPMI indices | $\beta$ | # non-zero ports (n) | Power/non-zero port ($\beta$/n) | TPMI indices | $\beta$ | # non-zero ports (n) | Power/non-zero port ($\beta$/n) |
| NC | 1 | 0-3 | 1 | 1 | 1 | | | | | | | | |
| | 2 | 0-5 | 1 | 2 | ½ | | | | | | | | |
| | 3 | 0 | 1 | 3 | ⅓ | | | | | | | | |
| | 4 | 0 | 1 | 4 | ¼ | | | | | | | | |
| PC + NC | 1 | 0-3 | ½ | 1 | ½ | 4-11 | 1 | 2 | ½ | | | | |
| | 2 | 0, 2, 3, 5 | ½ | 2 | ¼ | 6-13 | 1 | 4 | ¼ | | | | |
| | | 1, 4 | 1 | 2 | ½ | | | | | | | | |
| | 3 | 0 | ¾ | 3 | ¼ | 1-2 | 1 | 4 | ¼ | | | | |
| | 4 | 0 | 1 | 4 | ¼ | 1-2 | 1 | 4 | ¼ | | | | |
| FC + PC + NC | 1 | 0-3 | ¼ | 1 | ¼ | 4-11 | ½ | 2 | ¼ | 12-27 | 1 | 4 | ¼ |
| | 2 | 0-5 | ½ | 2 | ¼ | 6-13 | 1 | 4 | ¼ | 14-21 | 1 | 4 | ¼ |
| | 3 | 0 | ¾ | 3 | ¼ | 1-2 | 1 | 4 | ¼ | 3-6 | 1 | 4 | ¼ |
| | 4 | 0 | 1 | 4 | ¼ | 1-2 | 1 | 4 | ¼ | 3-4 | 1 | 4 | ¼ |

At least one of the following sub-embodiments is used in order to ensure that power per non-zero antenna port does not change for a given rank.

In one sub-embodiment 3-1, the $\beta_1$ value for 4 antenna ports, coherence type=partialAndNonCoherent, rank 2, and non-coherent TPMI indices 1 and 4 are set to $\beta_1=1/2$. Note that the power per non-zero antenna port becomes ¼ and hence equals the power per non-zero antenna port for other rank 2 TPMIs.

In one sub-embodiment 3-2, for each rank r, the $\beta_1$ value is determined using or based on only the most coherent TPMIs, and the determined $\beta_1$ value is used for all TPMIs of rank r. In one example, FC+PC+NC coherence type, most coherent TPMIs=FC TPMIs. In one example, PC+NC coherence type, most coherent TPMIs=PC TPMIs. In one example, NC coherence type, most coherent TPMIs=NC TPMIs.

In one sub-embodiment 3-3, for a given rank r, the $\beta_1$ value is determined as $\beta_1=\min 1/\gamma_1$, where $\gamma_1$=number of coherent port groups on which the non-zero PUSCH is transmitted using TPMI i.

Note that the power per non-zero antenna port becomes ¼ for all rank 2 TPMIs in case of 4 antenna ports and coherence type=partialAndNonCoherent with any of the sub-embodiments 3-1, 3-2, and 3-3. The resultant value is summarized in TABLE 21 and TABLE 22.

TABLE 21

$\beta$ value according to Alt 3-2 and for 2 antenna ports

| Coherence type | Rank | $\beta_1$ | Non-Coherent TPMIs ||| Full-Coherent TPMIs |||
|---|---|---|---|---|---|---|---|---|
| | | | TPMI indices | $\beta_2$ | $\beta$ | TPMI indices | $\beta_2$ | $\beta$ |
| NC | 1 | 1 | 0-1 | 1 | 1 | | | |
| | 2 | ½ | 0 | 2 | 1 | | | |
| FC + PC + NC | 1 | 1 | 0-1 | ½ | ½ | 2-5 | 1 | 1 |
| | 2 | 1 | 0 | 1 | 1 | 1-2 | 1 | 1 |

TABLE 22

$\beta$ value according to Alt 3-2 and for 4 antenna ports

| Coherence type | Rank | $\beta_1$ | Non-Coherent TPMIs ||| Partial-Coherent TPMIs ||| Full-Coherent TPMIs |||
|---|---|---|---|---|---|---|---|---|---|---|---|
| | | | TPMI indices | $\beta_2$ | $\beta$ | TPMI indices | $\beta_2$ | $\beta$ | TPMI indices | $\beta_2$ | $\beta$ |
| NC | 1 | 1 | 0-3 | 1 | 1 | | | | | | |
| | 2 | ½ | 0-5 | 2 | 1 | | | | | | |
| | 3 | ⅓ | 0 | 3 | 1 | | | | | | |
| | 4 | ¼ | 0 | 4 | 1 | | | | | | |
| PC + NC | 1 | 1 | 0-3 | ½ | ½ | 4-11 | 1 | 1 | | | |
| | 2 | ½ | 0-5 | 1 | ½ | 6-13 | 2 | 1 | | | |
| | 3 | ½ | 0 | ¾ | ¾ | 1-2 | 2 | 1 | | | |
| | 4 | ½ | 0 | 2 | 1 | 1-2 | 2 | 1 | | | |
| FC + PC + NC | 1 | 1 | 0-3 | ¼ | ¼ | 4-11 | ½ | ½ | 12-27 | 1 | 1 |
| | 2 | 1 | 0-5 | ½ | ½ | 6-13 | 1 | 1 | 14-21 | 1 | 1 |
| | 3 | 1 | 0 | ¾ | ¾ | 1-2 | 1 | 1 | 3-6 | 1 | 1 |
| | 4 | 1 | 0 | 1 | 1 | 1-2 | 1 | 1 | 3-4 | 1 | 1 |

In sub-embodiment 3-4, for non-codebook based UL transmission, $\beta=1$, i.e. the total power is split equally across the antenna ports on which the non-zero PUSCH is transmitted.

In one embodiment 4, for codebook based UL transmission, the power scaling for UL transmission is applied to the pre-coding matrix W indicated by the TPMI (instead of power scaling to the PUSCH transmission as provided in embodiments 1-3). For example, the pre-coding matrix W (cf. TABLE 1 to TABLE 6) is scaled by $\sqrt{\beta}$ or $\sqrt{\beta_1\beta_2}$, i.e., $\sqrt{\beta}$ or $\sqrt{\beta_1\beta_2}$ is included in the pre-multiplication (scalar normalization) factor in front of the pre-coding matrix W, where or $(\beta_1, \beta_2)$ is according to one of the alternatives in embodiments in this disclosure, for example Alt 3-2.

For non-codebook based UL transmission, the UE can determine the UE's PUSCH precoder and transmission rank based on the wideband SRI field from the DCI, and applies the power scaling $$\beta = \frac{1}{\sqrt{r}},$$

where r is the transmission rank.

In one embodiment 5, for codebook based UL transmission, the power scaling for UL transmission is applied to both the pre-coding matrix W indicated by the TPMI and the PUSCH transmission. For example: $\sqrt{\beta_1}$ scaling is applied to the precoding matrix W, and $\beta_2$ scaling is applied to the NZ PUSCH transmission; or $\sqrt{\beta_2}$ scaling is applied to the precoding matrix W, and $\beta_1$ scaling is to the NZ PUSCH transmission, where $\beta_1$ and $\beta_2$ are according to one of the alternatives in embodiments in this disclosure, for example Alt 3-2, 3-3, or 3-6.

For non-codebook based UL transmission, the power scaling $$\beta = \frac{1}{\sqrt{r}},$$

where r is the transmission rank, is applied to one of the pre-coding matrix W indicated by the TPMI and the PUSCH transmission.

In one embodiment 6, whether the UE is capable of changing (adapting) power of a non-zero PUSCH antenna port from multiple values (that correspond to multiple $\beta$ values) is reported by the UE as a part of the UE capability signaling. For example, the UE reports (via 1 bit capability signaling) that whether it can support only $$\beta = \frac{\rho_0}{\rho}$$

(e.g., Alt 1-2) or both $$\beta = \frac{\rho_0}{\rho}$$

(e.g., Alt 1-2) and $\beta=\beta_1\beta_2$ (e.g., Alt 3-2, 3-3, or 3-6).

In one embodiment 7, for PUSCH, a UE first scales a linear value $\hat{P}_{PUSCH,f,c}(i, j, q_d, l)$ of the transmit power $P_{PUSCH,f,c}(i, j, q_d, l)$ on UL BWP b of carrier f of serving cell c, by $\beta$ and the resulting scaled power is then split equally across the antenna ports on which the non-zero PUSCH is transmitted, where $\beta=\beta_1\beta_2$ is according to at least one of Alt 3-2 to Alt 3-6, if $\beta\hat{P}_{PUSCH,f,c}(i, j, q_d, l)/\rho_0 \leq \hat{P}_{CMAX,f,c}(i)/\rho$, $$\beta = \beta_2 = \frac{\rho_0}{\rho},$$

otherwise.

$\hat{P}_{CMAX,f,c}(i)$ is a linear value of $P_{CMAX,f,c}(i)$ that is the configured UE transmit power for carrier f of serving cell c in PUSCH transmission period i.

In a variation 7A, the inequality condition is replaced with $\beta\hat{P}_{PUSCH,f,c}(i, j, q_d, l)/\rho_0 \leq \hat{P}_{CMAX,f,c}(i)$.

In one example of this embodiment (based on Alt 3-3), $\beta=\beta_1\beta_2$, $$\beta_2 = \frac{\rho_0}{\rho} \text{ and } \beta_1 = \frac{G}{G_0},$$

where $\beta_1$ value is given by TABLE 15 in which the $G_0$ value is according to TABLE 14 and G=K is according to TABLE 11, if $\hat{\beta}_1\hat{P}_{PUSCH,f,c}(i, j, q_d, l) \leq \hat{P}_{CMAX,f,c}(i)$ or $\beta_1\hat{P}_{PUSCH,f,c}(i, j, q_d, l) \leq \rho\hat{P}_{CMAX,f,c}(i)$ (variation 7A), $\beta_1=1$, otherwise.

In one example (based on Alt 3-6), $$\beta = \beta_1\beta_2, \beta_2 = \frac{\rho_0}{\rho} \text{ and } \beta_1 = \max\left(1, \frac{G}{R}\right),$$

where G value is given by G=K in TABLE 11, if $\beta_1\hat{P}_{PUSCH,f,c}((i, j, q_d, l) \leq \hat{P}_{CMAX,f,c}(i)$ or $\beta_1\hat{P}_{PUSCH,f,c}(i, j, q_d, l) \leq \rho\hat{P}_{CMAX,f,c}(i)$ (variation 7A), $\beta_1=1$, otherwise.

In one embodiment 8, for PUSCH, a UE first scales a linear value $\hat{P}_{PUSCH,f,c}(i, j, q_d, l)$ of the transmit power $P_{PUSCH,f,c}(i, j, q_d, l)$ on UL BWP b of carrier f of serving cell c, by $\beta$ and the resulting scaled power is then split equally across the antenna ports on which the non-zero PUSCH is transmitted, where $\beta=\beta_1\beta_2$ is according to at least one of Alt 3-2 to Alt 3-6, if $\beta\hat{P}_{PUSCH,f,c}(i, j, q_d, l)/\rho_0 \leq \hat{P}_{CMAX\_H,f,c}(i)/\rho$ $$\beta = \beta_2 = \frac{\rho_0}{\rho},$$

otherwise.

$\hat{P}_{CMAX\_H,f,c}$ is a linear value of $P_{CMAX\_H,f,c}=\text{MIN}\{P_{EMAX,c}, P_{PowerClass}-\Delta P_{PowerClass}\}$ where $P_{EMAX,c}$ is the value given by information element (IE) P-Max for serving cell c; $P_{PowerClass}$ is the maximum UE power; $\Delta P_{PowerClass}=3$ dB for a power class 2 capable UE operating in Band n41, when P-max of 23 dBm or lower is indicated or if the uplink/downlink configuration is 0 or 6 in the cell; otherwise, $\Delta$PPowerClass=0 dB. In a variation 8A, the inequality condition is replaced with $\beta\hat{P}_{PUSCH,f,c}(i, j, q_d, l)/\rho_0 \leq \hat{P}_{CMAX\_H,f,c}(i)$.

In one example of this embodiment (based on Alt 3-3), $\beta=\beta_1\beta_2$, $$\beta_2 = \frac{\rho_0}{\rho} \text{ and } \beta_1 = \frac{G}{G_0},$$

where $\beta_1$ value is given by TABLE 15 in which the $G_0$ value is according to TABLE 14 and G=K is according to TABLE 11, if $\beta_1 \hat{P}_{PUSCH,f,c}(i, j, q_d, l) \leq \hat{P}_{CMAX\_H, f,c}(i)$ or $\beta_1 \hat{P}_{PUSCH,f,c}(i, j, q_d, l) \leq \rho \hat{P}_{CMAX\_H,f,c}(i)$ (variation 8A), $\beta_1=1$, otherwise.

In one example (based on Alt 3-6), $\beta=\beta_1\beta_2$, $$\beta_2 = \frac{\rho_0}{\rho} \text{ and } \beta_1 = \max\left(1, \frac{G}{R}\right),$$

where G value is given by G=K in TABLE 11, if $\beta_1 \hat{P}_{PUSCH,f,c}(i, j, q_d, l) \leq \hat{P}_{CMAX\_H,f,c}(i)$ or $\beta_1 \hat{P}_{PUSCH,f,c}(i, j, q_d, l) - \rho \hat{P}_{CMAX\_H,f,c}(i)$ (variation 8A), $\beta_1=1$, otherwise.

In one embodiment 9, for PUSCH, a UE first scales a linear value $\hat{P}_{PUSCH,f,c}(i, j, q_d, l)$ of the transmit power $P_{PUSCH,f,c}(i, j, q_d, l)$ on UL BWP b of carrier f of serving cell c, by $\beta$ and the resulting scaled power is then split equally across the antenna ports on which the non-zero PUSCH is transmitted, where $\beta=\beta_1\beta_2$ is according to at least one of Alt 3-2 to Alt 3-6, if $\beta \hat{P}_{PUSCH,f,c}(i, j, q_d, l) \leq \rho_0 \leq \hat{P}_{PowerClass}/\rho$, $$\beta = \beta_2 = \frac{\rho_0}{\rho},$$

otherwise.

$\hat{P}_{PowerClass}$ is a linear value of $P_{PowerClass}$ that is the maximum UE power. In a variation 9A, the inequality condition is replaced with $\beta \hat{P}_{PUSCH,f,c}(i, j, q_d, l)/\rho_0 \leq \hat{P}_{PowerClass}$.

In one example of this embodiment (based on Alt 3-3), $\beta=\beta_1\beta_2$, $$\beta_2 = \frac{\rho_0}{\rho} \text{ and } \beta_1 = \frac{G}{G_0},$$

where $\beta_1$ value is given by TABLE 15 in which the $G_0$ value is according to TABLE 14 and G=K is according to TABLE 11, if $\beta_1 \hat{P}_{PUSCH,f,c}(i, j, q_d, l) \leq \hat{P}_{PowerClass}$ or $\beta_1 \hat{P}_{PUSCH,f,c}(i, j, q_d, l) \leq \rho \hat{P}_{PowerClass}$ (variation 9A), $\beta_1=1$, otherwise.

In one example (based on Alt 3-6), $\beta=\beta_1\beta_2$, $$\beta_2 = \frac{\rho_0}{\rho} \text{ and } \beta_1 = \max\left(1, \frac{G}{R}\right),$$

where G value is given by G=K in TABLE 11, if $\beta_1 \hat{P}_{PUSCH,f,c}(i, j, q_d, l) \leq \hat{P}_{PowerClass}$ or $\beta_1 \hat{P}_{PUSCH,f,c}(i, j, q_d, l) \leq \rho \hat{P}_{PowerClass}$ (variation 9A), $\beta_1=1$, otherwise.

In one embodiment 9A, which is a variation of embodiment 9, $\hat{P}_{PowerClass}$ is replaced with $\hat{P}_{PowerClass} - \Delta \hat{P}_{PowerClass}$, where $\Delta \hat{P}_{PowerClass}$ is a linear value of $\Delta P_{PowerClass}$.

A non-zero PUSCH antenna port corresponds to a UE antenna port from which PUSCH (data) is transmitted. For codebook-based UL transmission, this corresponds to a UE antenna port which is assigned a non-zero precoding weight indicated by TRI/TPMI related field in DCI. For non-codebook-based UL transmission, this corresponds to a UE antenna port which is indicated by SRI related field in DCI.

A zero PUSCH antenna port corresponds to a UE antenna port from which PUSCH (data) is not transmitted. For codebook-based UL transmission, this corresponds to a UE antenna port which is assigned a zero precoding weight indicated by the TRI/TPMI related field in DCI. For non-codebook-based UL transmission, this corresponds to a UE antenna port which is not indicated by SRI related field in DCI.

In one embodiment 10, a UE reports the UE's capability (e.g., via UE capability signaling) that whether or not the UE is capable of scaling (or changing or adapting), from multiple values, power of a non-zero PUSCH antenna port (or a power amplifier transmitting a non-zero PUSCH data) via UL power control and/or power of a precoding matrix (indicated by the TPMI for codebook-based UL transmission or indicated by SRI for non-codebook-based UL transmission). The multiple scaling values can correspond to multiple values provided in the present disclosure. As an example, the UE reports (via 1 bit capability signaling) that whether the UE can support only one $\beta$ value or two $\beta$ values.

If the UE can scale power of both non-zero PUSCH antenna ports and precoding matrix, then the $\beta$ value can be factored into two as $\beta=\beta_1\beta_2$, or comprises two factors $\beta_1$ and $\beta_2$, where one of the two factors (e.g., $\beta_1$) is used to scale the non-zero PUSCH antenna ports, and the other factor (e.g., $\beta_2$) is used to scale the precoding matrix.

In one sub-embodiment 10-1, for codebook based UL transmission, the UE scales power according to at least one of the following alternatives.

In one example of Alt 10-1-1, scaling is applied (pre-multiplied) to the precoding matrix W, and $\beta_2$ scaling is applied to the NZ PUSCH transmission via UL power control. In one example of Alt 10-1-2, $\sqrt{\beta_1}$ scaling is applied (pre-multiplied) to the precoding matrix W, and $\beta_1$ scaling is applied to the NZ PUSCH transmission via UL power control.

In one example 10-1-1, $\beta_1$ and $\beta_2$ are according to one of the alternatives in embodiments in this disclosure, for example Alt 3-2, 3-3, or 3-6.

In one example 10-1-2 (of Alt 10-1-1), $\beta_2$ scaling is the same as that in Alt 1-2 in embodiment 1, i.e., $$\beta_2 = \frac{\rho_0}{\rho};$$

and $\beta_1$ for precoder scaling can take one or multiple values depending on UE capability. If $\beta_1$ can take only one value, then it is $\beta_1=1$. If $\beta_1$ can take two values, then the first of the two values can be $\beta_1=1$ and the second can be $\beta_1$ according to one of Alt 3-2, 3-3, or 3-6.

If the UE is capable of supporting multiple $\beta_1$ values, then one of them can be configured. This configuration can be via higher layer (e.g., RRC) signaling either explicitly using a separate RRC parameter or implicitly using at least one of UL codebook related parameters such as ULCodebookSubset and ULmaxRank. Alternatively, the configuration about $\beta_1$ value is dynamic via DCI signaling, e.g., using DCI format 0_1 either explicitly using a separate DCI field or implicitly using at least one of UL codebook related field such as TRI/TPMI or/and SRI.

In one scheme of 10-1-1, the multiple $\beta_1$ values can be supported by introducing a new UL codebook parameter, for example, transmit power indicator (TPI). If two $\beta_1$ values are supported, then TPI=0 can indicate $\beta_1$=1 and TPI=1 can indicate $\beta_1$ according to one of Alt 3-2, 3-3, or 3-6. The other codebook parameters such as TRI/TPMI remains the same regardless of the $\beta_1$ value that is used for transmission. The UL codebook table for 2 and 4 antenna ports are then obtained by replacing the pre-multiplication factors in some of the TPMIs. For example: for TABLE 1, replace $$\frac{1}{\sqrt{2}} \text{ with } \frac{\sqrt{\beta_1}}{\sqrt{2}}$$

in TPMI 0-1; for TABLE 2, replace ½ with $$\frac{1}{2} \text{ with } \frac{\sqrt{\beta_1}}{2}$$

in TPMI 0-11; for TABLE 3, replace $$\frac{1}{\sqrt{2}} \text{ with } \frac{\sqrt{\beta_1}}{\sqrt{2}}$$

in TPMI 0; for TABLE 4, replace ½ with $$\frac{1}{2} \text{ with } \frac{\sqrt{\beta_1}}{2}$$

in TPMI 0-5; and for TABLE 5, replace ½ with $$\frac{1}{2} \text{ with } \frac{\sqrt{\beta_1}}{2}$$

in TPMI 0.

In one scheme of 10-1-2, there is no separate UL codebook parameter for $\beta_1$ scaling, and the UL codebook comprises precoding matrices for all $\beta_1$ values that are supported. The UL codebook table for 2 and 4 antenna ports are then obtained by adding the TPMIs for additional $\beta_1$ values. For example, if two $\beta_1$ values are supported, then one of them can be $\beta_1$=1 and the other can be $\beta_1$ according to one of Alt 3-2, 3-3, or 3-6.

The additional TPMIs from TABLE 23 are added to TABLE 1. The additional TPMIs from TABLE 24 are added to TABLE 2. The additional TPMIs from TABLE 25 are added to TABLE 3. The additional TPMIs from TABLE 26 are added to TABLE 4.

The additional TPMIs from TABLE 27 are added to TABLE 5.

TABLE 23

Additional precoding matrix W for single-layer transmission using two antenna ports.

| TPMI index | W (ordered from left to right in increasing order of TPMI index) | |
|---|---|---|
| X to X + 1 (e.g., X = 6) | $\frac{\sqrt{\beta_1}}{\sqrt{2}}\begin{bmatrix}1\\0\end{bmatrix}$ | $\frac{\sqrt{\beta_1}}{\sqrt{2}}\begin{bmatrix}0\\1\end{bmatrix}$ |

TABLE 24

Additional precoding matrix W for single-layer transmission using four antenna ports with transform precoding disabled.

| TPMI index | W (ordered from left to right in increasing order of TPMI index) |
|---|---|
| X to X + 11 (e.g., X = 28) | $\frac{\sqrt{\beta_1}}{2}\begin{bmatrix}1\\0\\0\\0\end{bmatrix}$ $\frac{\sqrt{\beta_1}}{2}\begin{bmatrix}0\\1\\0\\0\end{bmatrix}$ $\frac{\sqrt{\beta_1}}{2}\begin{bmatrix}0\\0\\1\\0\end{bmatrix}$ $\frac{\sqrt{\beta_1}}{2}\begin{bmatrix}0\\0\\0\\1\end{bmatrix}$ $\frac{\sqrt{\beta_1}}{2}\begin{bmatrix}1\\0\\1\\0\end{bmatrix}$ $\frac{\sqrt{\beta_1}}{2}\begin{bmatrix}1\\0\\-1\\0\end{bmatrix}$ $\frac{\sqrt{\beta_1}}{2}\begin{bmatrix}1\\0\\j\\0\end{bmatrix}$ $\frac{\sqrt{\beta_1}}{2}\begin{bmatrix}1\\0\\-j\\0\end{bmatrix}$ $\frac{\sqrt{\beta_1}}{2}\begin{bmatrix}0\\1\\0\\1\end{bmatrix}$ $\frac{\sqrt{\beta_1}}{2}\begin{bmatrix}0\\1\\0\\-1\end{bmatrix}$ $\frac{\sqrt{\beta_1}}{2}\begin{bmatrix}0\\1\\0\\j\end{bmatrix}$ $\frac{\sqrt{\beta_1}}{2}\begin{bmatrix}0\\1\\0\\-j\end{bmatrix}$ |

TABLE 25

Additional precoding matrix W for two-layer transmission
using two antenna ports with transform precoding disabled.

| TPMI index | W (ordered from left to right in increasing order of TPMI index) |
|---|---|
| X (e.g., X = 3) | $\frac{\sqrt{\beta_1}}{\sqrt{2}}\begin{bmatrix}1 & 0\\0 & 1\end{bmatrix}$ |

TABLE 26

Additional precoding matrix W for two-layer transmission
using four antenna ports with transform precoding disabled.

| TPMI index | W (ordered from left to right in increasing order of TPMI index) |
|---|---|
| X to X + 5 (e.g., X = 22) | $\frac{\sqrt{\beta_1}}{2}\begin{bmatrix}1 & 0\\0 & 1\\0 & 0\\0 & 0\end{bmatrix}$ $\frac{\sqrt{\beta_1}}{2}\begin{bmatrix}1 & 0\\0 & 0\\0 & 1\\0 & 0\end{bmatrix}$ $\frac{\sqrt{\beta_1}}{2}\begin{bmatrix}1 & 0\\0 & 0\\0 & 0\\0 & 1\end{bmatrix}$ $\frac{\sqrt{\beta_1}}{2}\begin{bmatrix}0 & 0\\1 & 0\\0 & 1\\0 & 0\end{bmatrix}$ $\frac{\sqrt{\beta_1}}{2}\begin{bmatrix}0 & 0\\1 & 0\\0 & 0\\0 & 1\end{bmatrix}$ $\frac{\sqrt{\beta_1}}{2}\begin{bmatrix}0 & 0\\0 & 0\\1 & 0\\0 & 1\end{bmatrix}$ |

TABLE 27

Additional precoding matrix W for three-layer transmission
using four antenna ports with transform precoding disabled.

| TPMI index | W (ordered from left to right in increasing order of TPMI index) |
|---|---|
| X (e.g., X = 4) | $\frac{\sqrt{\beta_1}}{2}\begin{bmatrix}1 & 0 & 0\\0 & 1 & 0\\0 & 0 & 1\\0 & 0 & 0\end{bmatrix}$ |

In one sub-embodiment 10-2, for codebook based UL transmission, the $\beta_1$ scaling may also depend on the configured value of ULCodebookSubset.

When ULCodebookSubset=FC+PC+NC, the at least one of the following is used for the $\beta_1$ scaling.

In one example of Alt 10-2-1, only one $\beta_1$ scaling (e.g., $\beta_1=1$) can be used for regardless of whether the pre-coding matrix corresponds to FC, PC, or NC transmission—this is regardless of the UE capability that whether one or multiple $\beta_1$ scaling can be supported by the UE.

In one example of Alt 10-2-2, multiple $\beta_1$ (e.g., 2 values) scaling can be used if the UE is capable of supporting them. At least one of the following sub-alternatives can be used.

In one instance Alt 10-2-2-1, the two $\beta_1$ values can only be used for the pre-coding matrix corresponding to NC transmission. For FC and PC, only one $\beta_1$ scaling (e.g., $\beta_1=1$) can be used.

In one instance of Alt 10-2-2-2, the two $\beta_1$ values can only be used for the pre-coding matrix corresponding to PC transmission. For FC and NC, only one $\beta_1$ scaling (e.g., $\beta_1=1$) can be used.

In one instance of Alt 10-2-2-3, the two $\beta_1$ values can only be used for the pre-coding matrix corresponding to PC and NC transmission. For FC, only one $\beta_1$ scaling (e.g., $\beta_1=1$) can be used.

When ULCodebookSubset=PC+NC, the at least one of the following is used for the $\beta_1$ scaling.

In one example of Alt 10-2-3, only one $\beta_1$ scaling (e.g., $\beta_1=1$) can be used for regardless of whether the pre-coding matrix corresponds to PC or NC transmission—this is regardless of the UE capability that whether one or multiple $\beta_1$ scaling can be supported by the UE.

In one example of Alt 10-2-4, multiple $\beta_1$ (e.g., 2 values) scaling can be used if the UE is capable of supporting them. At least one of the following sub-alternatives can be used.

In one instance of Alt 10-2-4-1, the two $\beta_1$ values can only be used for the pre-coding matrix corresponding to NC transmission. For PC, only one $\beta_1$ scaling (e.g., $\beta_1=1$) can be used.

In one instance of Alt 10-2-4-2, the two $\beta_1$ values can only be used for the pre-coding matrix corresponding to PC transmission. For NC, only one $\beta_1$ scaling (e.g., $\beta_1=1$) can be used.

When ULCodebookSubset=NC, the at least one of the following is used for the $\beta_1$ scaling.

In one example of Alt 10-2-5, only one $\beta_1$ scaling (e.g., $\beta_1=1$) can be used—this is regardless of the UE capability that whether one or multiple $\beta_1$ scaling can be supported by the UE.

In one example of Alt 10-2-6, multiple $\beta_1$ (e.g., 2 values) scaling can be used if the UE is capable of supporting them.

In one sub-embodiment 10-2, for codebook based UL transmission, the UE scales power according to at least one of the following alternatives.

In one example of Alt 10-2-1, $\sqrt{\beta_1}$ scaling is applied (pre-multiplied) to UE antenna port(s) which is (are) indicated by SRI related field in DCI, and $\beta_2$ scaling is applied to the NZ PUSCH transmission via UL power control.

In one example of Alt 10-2-2, $\sqrt{\beta_2}$ scaling is applied (pre-multiplied) to UE antenna port(s) which is (are) indicated by SRI related field in DCI, and $\beta_1$ scaling is applied to the NZ PUSCH transmission via UL power control.

In such example of 10-2-1, $\beta_1$ and $\beta_2$ are according to one of the alternatives in embodiments in this disclosure, for example Alt 3-2, 3-3, or 3-6.

In such example of 10-2-2, the $\beta_1$ scaling for the NC case of codebook-based UL transmission is also applicable to the non-codebook-based UL transmission.

The other examples/alternatives in sub-embodiment 10-1 are also applicable to this sub-embodiment.

In one embodiment 11, for codebook-based UL transmission, a UE reports the UE's capability (e.g., via UE capability signaling) that whether the UE is capable of UL transmission utilizing full power. In particular, a UE with NC or PC antenna ports, reports whether the UE can transmit at full power for all or some rank values.

In one example of 11-0, if the UE is capable of full power transmission, then the network/gNB configures an UL codebook for TPMI indication wherein: for FC+PC+NC UEs, the configured UL codebook is the same as codebook as shown in TABLE 1 through TABLE 6; for PC+NC UEs, the configured UL codebook includes K FC TPMIs for rank 1, where K=1 or K>1, and for rank>1, the configured UL codebook is the same as codebook TABLE 3 through TABLE 6; for NC UEs, the configured UL codebook includes K1, K2, and K3 FC (or optionally PC) TPMIs, for rank 1, 2, and 3, respectively, where K1, K2, K3=1 or K1, K2, K3>1; for 4 antenna ports, rank=4, the configured UL codebook is the same as codebook TABLE 6.

The configuration of UL codebook with full power can be via higher layer (e.g., RRC) signaling. For PC+NC UEs, the higher layer parameter ULCodebookSubset=partialAndNonCoherentFullPower indicates the configured UL codebook according to scheme 11-0. For NC UEs, the higher layer parameter ULCodebookSubset=nonCoherentFullPower indicates the configured UL codebook according to the aforementioned example 11-0. Alternatively, the configuration of full power UL transmission for PC+NC and NC UEs can be based on a new higher layer parameter, e.g., ulFullPower.

In one example 11-0-0, for PC+NC UEs, K=1 and the FC TPMI included in the rank 1 codebook corresponds to the FC TPMI with the smallest FC TPMI index. Likewise, for NC UEs, K1=K2=K3=1 and the FC TPMI included in the rank 1-3 codebook corresponds to the FC TPMI with the smallest FC TPMI index.

In one example 11-0-1, for PC+NC UEs, K>1 and the FC TPMIs included in the rank 1 codebook corresponds to all FC TPMIs. Likewise, for NC UEs, K1, K2, K3>1 and the FC TPMIs included in the rank 1-3 codebook corresponds to all FC TPMIs.

In one example 11-0-2, for PC+NC UEs, K>1 and the FC TPMIs included in the rank 1 codebook corresponds to a subset of FC TPMIs starting from the smallest FC TPMI index. Likewise, for NC UEs, K1, K2, K3>1 and the FC TPMIs included in the rank 1-3 codebook corresponds to a subset of FC TPMIs starting from the smallest FC TPMI index.

The K or (K1, K2, K3) FC TPMIs included in the UL codebook for PC+NC and NC, respectively are according to at least one of the following alternatives.

In one embodiment of Alt 11-0-0, the precoders or precoding matrixes corresponding to the included K FC TPMIs replace that for the K NC TPMIs, where the K NC TPMIs start from the smallest NC TPMI index (e.g., TPMI=0). Likewise, the precoders or precoding matrixes corresponding to the included (K1, K2, K3) FC TPMIs replace that for the (K1, K2, K3) NC TPMIs, respectively, where the (K1, K2, K3) NC TPMIs start from the smallest NC TPMI index (e.g., TPMI=0).

In one embodiment of Alt 11-0-1, K FC TPMIs are in addition to NC+PC TPMIs. Likewise, (K1, K2, K3) FC TPMIs are in addition to the (K1, K2, K3) NC TPMIs, respectively.

An example of codebook tables based on example 11-0-0 and Alt 11-0-1 is shown in TABLE 28 through TABLE 31. An example mapping of TPMI index 0 for full power UL transmission is shown in TABLE 32.

TABLE 28

Precoding matrix W for single-layer transmission using two antenna ports.

| TPMI index | W (ordered from left to right in increasing order of TPMI index) |
|---|---|
| 0 | $\frac{1}{\sqrt{2}}\begin{bmatrix}1\\0\end{bmatrix}$ if UE is not capable of full power UL transmission; FC precoding matrix, e.g., $\frac{1}{\sqrt{2}}\begin{bmatrix}1\\1\end{bmatrix}$ (FC TPMI index 2) if UE reports "Non-Coherent" capability, and UE is capable of full power UL transmission |
| 1-5 | Precoding matrix for TPMI index 1-5 in TABLE 1 |

TABLE 29

Precoding matrix W for single-layer transmission using four antenna ports with transform precoding disabled.

| TPMI index | W (ordered from left to right in increasing order of TPMI index) |
|---|---|
| 0 | $\frac{1}{2}\begin{bmatrix}1\\0\\0\\0\end{bmatrix}$ if UE is not capable of full power UL transmission; FC precoding matrix, e.g., $\frac{1}{2}\begin{bmatrix}1\\1\\1\\1\end{bmatrix}$ (FC TPMI index 12) if UE reports "Non-Coherent" or "partialAndNonCoherent" capability, and UE is capable of full power UL transmission |
| 1-27 | Precoding matrix for TPMI index 1-27 in TABLE 2. |

TABLE 30

Precoding matrix W for two-layer transmission using four antenna ports with transform precoding disabled.

| TPMI index | W (ordered from left to right in increasing order of TPMI index) |
|---|---|
| 0 | $\frac{1}{2}\begin{bmatrix} 1 & 0 \\ 0 & 1 \\ 0 & 0 \\ 0 & 0 \end{bmatrix}$ if UE is not capable of full power UL transmission; FC precoding matrix, e.g., $\frac{1}{2\sqrt{2}}\begin{bmatrix} 1 & 1 \\ 1 & 1 \\ 1 & -1 \\ 1 & -1 \end{bmatrix}$ (FC TPMI index 14) or PC precoding matrix, e.g., $\frac{1}{2}\begin{bmatrix} 1 & 0 \\ 0 & 1 \\ 1 & 0 \\ 0 & -j \end{bmatrix}$ (PC TPMI index 6) if UE reports "Non-Coherent" capability, and UE is capable of full power UL transmission |
| 1-21 | Precoding matrix for TPMI index 1-21 in TABLE 4 |

TABLE 31

Precoding matrix w for three-layer transmission using four antenna ports with transform precoding disabled.

| TPMI index | W (ordered from left to right in increasing order of TPMI index) |
|---|---|
| 0 | $\frac{1}{2}\begin{bmatrix} 1 & 0 & 0 \\ 0 & 1 & 0 \\ 0 & 0 & 1 \\ 0 & 0 & 0 \end{bmatrix}$ if UE is not capable of full power UL transmission; FC precoding matrix, e.g., $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ (FC TPMI index 3) or PC precoding matrix, e.g., $\frac{1}{2}\begin{bmatrix} 1 & 0 & 0 \\ 0 & 1 & 0 \\ 1 & 0 & 0 \\ 0 & 0 & 1 \end{bmatrix}$ (FC TPMI index 1) if UE reports "Non-Coherent" capability, and UE is capable of full power UL transmission |
| 1-6 | Precoding matrix for TPMI index 1-6 in TABLE 5 |

TABLE 32 mapping (replacing) of TPMI index = 0 for full power UL transmission

| UE coherence capability | Number of antenna ports | rank | TPMI index | UE is not capable of full power UL transmission | UE is capable of full power UL transmission |
|---|---|---|---|---|---|
| "Non-Coherent" | 2 | 1 | 0 | 0 | 2 |
|  | 4 | 1 | 0 | 0 | 12 |

TABLE 32-continued mapping (replacing) of TPMI index = 0 for full power UL transmission

| UE coherence capability | Number of antenna ports | rank | TPMI index | UE is not capable of full power UL transmission | UE is capable of full power UL transmission |
|---|---|---|---|---|---|
| | | 2 | 0 | 0 | 6 (PC TPMI) or 14 (FC TPMI) |
| | | 3 | 0 | 0 | 1 (PC TPMI) or 3 (FC TPMI) |
| "partialAndNonCoherent" | 4 | 1 | 0 | 0 | 12 |

In another example based on example 11-0-0 and Alt 11-0-1, the FC TPMI included in the codebook (that replaces NC TPMI 0) indicates a precoding matrix W which is according to at least one of the following examples.

In one example of Ex 11-0-0, W=FC TPMI with smallest FC TPMI index (as in TABLE 32). In one example of Ex 11-0-1, W=FC TPMI i selected randomly from all FC TPMIs, where the random selection is performed either by the UE or by the gNB/NW. When it is selected by the gNB/NW, then the selected index can be configured/indicated via higher layer signaling. In one example of Ex 11-0-2, W corresponds to a fixed TPMI, e.g., $$W = \frac{1}{\sqrt{2}}\begin{bmatrix}1\\1\end{bmatrix}$$

for rank 1, 2 antenna ports, and NC UE;

$$W = \frac{1}{2}\begin{bmatrix}1\\1\\1\\1\end{bmatrix}$$

for rank 1, 4 antenna ports, and NC or PC UE;

$$W = \frac{1}{2\sqrt{2}}\begin{bmatrix}1 & 1\\1 & 1\\1 & 1\\1 & 1\end{bmatrix}$$

for rank 2, 4 antenna ports, and NC UE; and $$= \frac{1}{2\sqrt{3}}\begin{bmatrix}1 & 1 & 1\\1 & 1 & 1\\1 & 1 & 1\\1 & 1 & 1\end{bmatrix}$$

for rank 3, 4 antenna ports, and NC UE.

In one embodiment 11-1, the UL full power transmission according to embodiment 11 is only applicable for 2 antenna ports. For 4 antenna ports, the UL full power is according to power scaling $\beta$ or $\beta_1\beta_2$ provided in some embodiments of this disclosure.

In one embodiment 11-2, the UL full power transmission according to both solutions (1) embodiment 11 and (2) power scaling $\beta$ or $\beta_1\beta_2$ provided in some embodiments of this disclosure are supported. Which of the two UL full transmission solutions is used is determined based one at least one of the following alternatives.

In one example of Alt 11-2-0, the gNB indicates/configures to the UE which of the two solutions is used for UL transmission. This indication can be via RRC or 1-bit DCI signaling.

In one example of Alt 11-2-1, the UE reports which of the two solutions the UE can support as UE capability signaling.

In one embodiment 11-3, for non-codebook-based UL transmission, the UL full power transmission is according to at least one of the following alternatives.

In one example of Alt 11-3-0, the UE scales (e.g., UL PC) the power of (NZ) PUSCH antenna ports by a factor $$\beta = \frac{1}{\sqrt{r}},$$

where r=rank value=number of SRS resources indicated via SRI.

In one example of Alt 11-3-1: if SRS is associated with CSI-RS, then the power scaling can be up to UE implementation; and if SRS is not associated with CSI-RS, then the UE scales (e.g., UL PC) the power of (NZ) PUSCH antenna ports by a factor $$\beta = \frac{1}{\sqrt{r}},$$

where r=rank value=number of SRS resources indicated via SRI.

In one embodiment 12, for codebook-based UL transmission (e.g., via higher layer parameter txConfig in PUSCH-Config set to "codebook"), a UE reports the UE's capability (e.g., via UE capability signaling) that whether the UE is capable of UL transmission utilizing full power. In particular, a UE with NC or PC antenna ports reports whether the UE can transmit at full power. Then, at least one of the following schemes is used for full power UL transmission.

In one embodiment 12-0, the scaling $\beta=1$ (Alt 1-1) is used in the UL power control mechanism. In particular, for a PUSCH transmission on active UL BWP of carrier f of serving cell c, a UE first calculates a linear value $\hat{P}_{PUSCH,b,f,c}(i, j, q_d, l)$ of the transmit power $P_{PUSCH,b,f,c}(i, j, q_d, l)$. If the PUSCH transmission is scheduled by a DCI format 0_1 and when txConfig in PUSCH-Config is set to "codebook," then the UE scales the linear value by the ratio of the number of antenna ports with a non-zero PUSCH transmission power to the maximum number of SRS ports supported by the UE in one SRS resource $$\left(\text{i.e., } \beta = \frac{\rho_0}{\rho}\right),$$

if the UE is not capable of full power UL transmission (i.e., does not report full power UL transmission capability), and the UE does not scale the linear value of the transmit power (or equivalently scales by β=1), if the UE is capable of full power UL transmission (i.e., reports full power UL transmission capability). Then, the UE splits the power equally across the antenna ports on which the UE transmits the PUSCH with non-zero power.

In one embodiment 12-1, at least one of the scaling values provided in this disclosure (e.g., Alt 1-3 or 3-2) is used in the UL power control mechanism. In particular, for a PUSCH transmission on active UL BWP b of carrier f of serving cell c, a UE first calculates a linear value $\hat{P}_{PUSCH,b,f,c}(i, j, q_d, 1)$ of the transmit power $P_{PUSCH,b,f,c}(i, j, q_d, 1)$. If the PUSCH transmission is scheduled by a DCI format 0_1 and when txConfig in PUSCH-Config is set to "codebook," then the UE scales the linear value by the ratio of the number of antenna ports with a non-zero PUSCH transmission power to the maximum number of SRS ports supported by the UE in one SRS resource $$\left(\text{i.e., } \beta = \frac{p_0}{p}\right),$$

if the UE is not capable of full power UL transmission (i.e., does not report full power UL transmission capability), and the UE scales the linear value by at least one of the values provided in this disclosure (e.g., Alt 1-3 or 3-2), if the UE is capable of full power UL transmission (i.e., reports full power UL transmission capability). Then, the UE splits the power equally across the antenna ports on which the UE transmits the PUSCH with non-zero power.

In one instance, the aforementioned embodiments as provided in embodiment 12-0 or embodiment 12-1 is applied only when the maximum number of SRS ports supported by the UE in one SRS resource is two, and another solution (as provided in this disclosure) is applied when the maximum number of SRS ports supported by the UE in one SRS resource is not equal to two (e.g., when the maximum number of SRS ports is equal to 4).

In another instance, the aforementioned embodiments as provided in embodiment 12-0 or embodiment 12-1 is applied only when the maximum number of SRS ports supported by the UE in one SRS resource is four, and another solution (as provided in this disclosure) is applied when the maximum number of SRS ports supported by the UE in one SRS resource is not equal to four (e.g., when the maximum number of SRS ports is equal to 2).

In one embodiment A, the UL full power transmission is according to embodiment 11/12 (or other embodiments in this disclosure) for a subset (S) of rank values supported by the UE for UL transmission. At least one of the following alternatives is used.

In one example of Alt A-0, the subset S is fixed, for example, S={1}. In another example of Alt A-1, the subset S is configured to the UE (via higher layer signaling, e.g., maxRank). An example of the S={1, 2, . . . maxRank}. In another example of Alt A-2, the subset S is reported by the UE. As an example, the UE can report the maximum rank value the UE is capable of full power UL transmission for. Then, S={1, 2, . . . , max rank value reported by the UE}. This reporting can be joint with the UE capability signaling for full power UL transmission. Alternatively, this is a separate UE capability report. In one example of Alt A-3, the UE reports a set (S") of rank values as in Alt 11A-2, and then the set S is selected/configured from the set S' to the UE.

In one embodiment B, the full power UL transmission is supported based on one or two solutions. At least one of the following alternatives is used.

In one example of Alt B-0, only one solution for full power UL transmission is supported regardless of number of antenna ports, e.g., 2 or 4. The supported solution is according to embodiment 11 or 12 or one of the β scaling (UL power control or codebook scaling) based solution provided in other embodiments of this disclosure. If the UE is capable of full power UL transmission, then the supported solution is used.

In one example of Alt B-1, only one solution for full power UL transmission is supported for a given number of antenna ports. At least one of the following two sub-alternatives is used.

In one example of Alt B-1-0, the supported solution is according to embodiment 11 or 12 for 2 antenna ports, and is according to the β scaling (UL power control or codebook scaling) based solution provided in other embodiments of this disclosure for 4 antenna ports. If the UE is capable of full power UL transmission, then the supported solution is used depending on the number of antenna ports at the UE.

In one example of Alt B-1-1, the supported solution is according to embodiment 11 or 12 for 4 antenna ports, and is according to the β scaling (UL power control or codebook scaling) based solution provided in other embodiments of this disclosure for 2 antenna ports. If the UE is capable of full power UL transmission, then the supported solution is used depending on the number of antenna ports at the UE.

In one example of Alt B-2, two solutions for full power UL transmission is supported regardless of number of antenna ports, e.g., 2 or 4. One of the two supported solutions is according to embodiment 11 or 12, and the other solution is according to the β scaling (UL power control or codebook scaling) based solution provided in other embodiments of this disclosure. If the UE is capable of full power UL transmission based on at least one of the two supported solutions, then the UE reports (as part of UE capability signaling) which of the two supported solutions it is capable of applying, and the corresponding solution is used for UL transmission. If the UE reports that it is capable of applying both solutions, then one of the two solutions is configured to the UE.

In one example of Alt B-3, two solutions for full power UL transmission is supported for a given number of antenna ports. One of the two supported solutions is according to embodiment 11 or 12, and the other solution is according to the β scaling (UL power control or codebook scaling) based solution provided in other embodiments of the present disclosure.

At least one of the following two sub-alternatives is used. In one example of Alt B-3-0, the two supported solutions are only for 2 antenna ports, and only one solution is supported for 4 antenna ports. For 2 antenna ports, the two solutions and other details are as explained in Alt B-2, and for 4 antenna ports, the supported solution and other details are as explained in Alt B-0.

In another example of Alt B-3-1, the two supported solutions are only for 4 antenna ports, and only one solution is supported for 2 antenna ports. For 4 antenna ports, the two solutions and other details are as explained in Alt B-2, and for 2 antenna ports, the supported solution and other details are as explained in Alt B-0.

Figure 12:
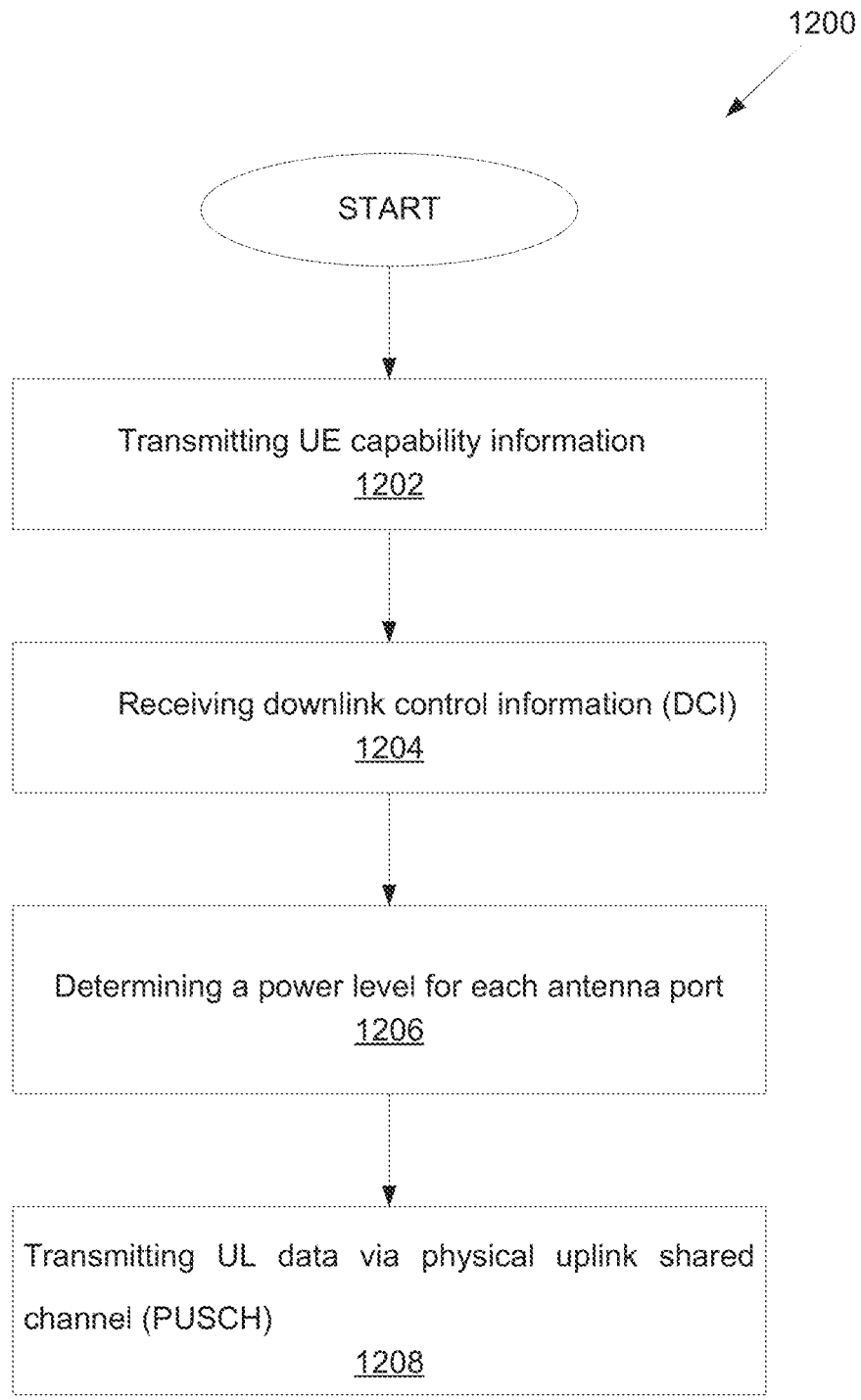
FIG. 12 illustrates a flow chart of a method for power control, as may be performed by a user equipment (UE), according to embodiments of the present disclosure.

FIG. 12 illustrates a flow chart of a method 1200 for power control, as may be performed by a user equipment (UE), according to embodiments of the present disclosure. The embodiment of the method 1200 illustrated in FIG. 12 is for illustration only. FIG. 12 does not limit the scope of this disclosure to any particular implementation.

As illustrates in FIG. 12, the method 1200 begins at step 1202. In step 1202, the UE (e.g., 111-116 as illustrated in FIG. 1) transmits, to a base station (BS), UE capability information including a full power transmission capability of the UE.

In step 1204, the UE receives, from the BS, downlink control information (DCI) including a transmit precoding matrix indicator (TPMI).

In step 1206, the UE determines a power level for each antenna port at the UE based on the full power transmission capability of the UE and the TPMI.

In step 1208, the UE transmits, to the BS, UL data via physical uplink shared channel (PUSCH) based on the determined power level for each antenna port at the UE and the TPMI where the TPMI indicates a precoding matrix and a number of layers used to transmit the UL data via the PUSCH.

In one embodiment, the UE in step 1206 determines the power level for each antenna port at the UE based on a power scaling factor ($\beta$). In such embodiment, the power scaling factor ($\beta$) scales a linear value ($\hat{P}$) of UL transmit power, and the linear value ($\hat{P}$) of the UL transmit power after power scaling, $\beta \times \hat{P}$, is divided equally across each antenna port on which the UE transmits the UL data via the PUSCH with non-zero power.

In one embodiment, the UE in step 1208 transmits the UE capability information including the power scaling factor ($\beta$).

In one embodiment, the UE in step 1205 receives, from the BS, a message including the power scaling factor ($\beta$).

In one embodiment, the power scaling factor ($\beta$) is determined based on the TPMI. In one embodiment, the power scaling factor ($\beta$) is set to one. In one embodiment, the power scaling factor ($\beta$) is given by $\beta=\beta_1\beta_2$. In such embodiment, $\beta_1$ is determined based on a coherence capability information of antenna ports at the UE where the UE capability information includes the coherence capability information and $\beta_2$ is a ratio $$\left(\frac{\rho_0}{\rho}\right)$$

of a number ($\rho_0$) of antenna ports with non-zero PUSCH transmission power to a maximum number ($\rho$) of sounding reference signal (SRS) ports supported by the UE in one SRS resource where the coherence capability is one of full-coherence, partial-coherence, or non-coherence, full-coherence indicating that all antenna ports at the UE can be used to transmit a layer of UL data, partial-coherence indicating that only a pair of antenna ports at the UE can be used to transmit a layer of UL data, and non-coherence indicating that only a single antenna port at the UE can be used to transmit a layer of UL data. Furthermore, $$\beta_1 = \max\left(1, \frac{G}{R}\right),$$

R is the number of layers indicated by the TPMI, and G is the number of coherent antenna port groups given by:

| Coherence capability | Number of antenna ports = 2 | Number of antenna ports = 4 |
|---|---|---|
| non-coherence | 2 | 4 |
| partial-coherence |  | 2 |
| full-coherence | 1 | 1 |

Figure 13:
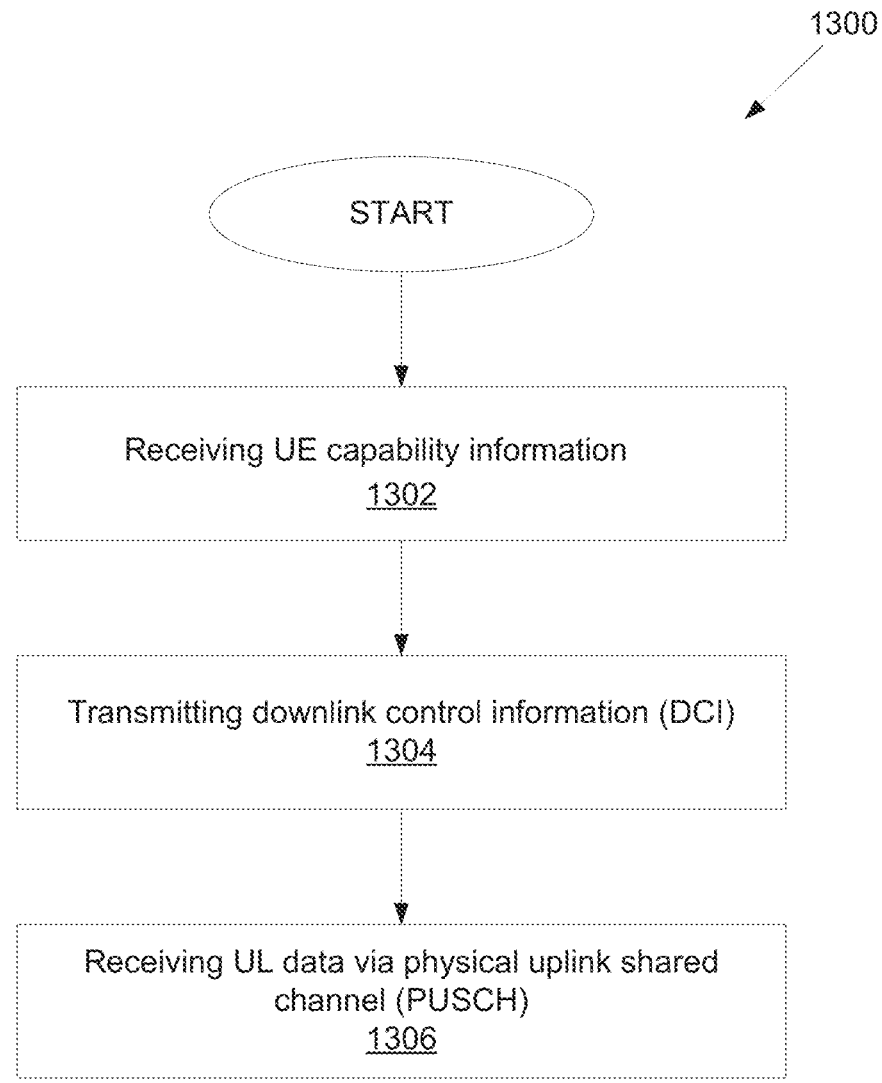
FIG. 13 illustrates a flow chart of another method for power control, as may be performed by a base station (BS), according to embodiments of the present disclosure.

FIG. 13 illustrates a flow chart of another method 1300 for power control, as may be performed by a base station (BS), according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the BS (e.g., 101-103 as illustrated in FIG. 1), receives, from a user equipment (UE), UE capability information including a full power transmission capability of the UE.

In step 1304, the BS transmits, to the UE, downlink control information (DCI) including a transmit precoding matrix indicator (TPMI). In step 1304, a power level for each antenna port at the UE is determined based on the full power transmission capability of the UE and the TPMI.

In step 1306, the BS receives, from the UE, UL data via physical uplink shared channel (PUSCH) based on the determined power level for each antenna port at the UE and the TPMI where the TPMI indicates a precoding matrix and a number of layers used to transmit the UL data via the PUSCH.

In one embodiment, the power level in step 1303 is determined for each antenna port at the UE based on a power scaling factor ($\beta$). In such embodiment, the power scaling factor ($\beta$) scales a linear value ($\hat{P}$) of UL transmit power, and the linear value ($\hat{P}$) of the UL transmit power after power scaling, $\beta \times \hat{P}$, is divided equally across each antenna port on which the UE transmits the UL data via the PUSCH with non-zero power.

In one embodiment, the BS in step 1306 receives, from the UE, the UE capability information including the power scaling factor ($\beta$).

In one embodiment, the BS in step 1304 transmits, to the UE, a message including the power scaling factor ($\beta$).

In one embodiment, the power scaling factor ($\beta$) is determined based on the TPMI.

In one embodiment, the power scaling factor ($\beta$) is set to one.

In one embodiment, the power scaling factor ($\beta$) is given by $\beta=\beta_1\beta_2$. In such embodiment, $\beta_1$ is determined based on a coherence capability information of antenna ports at the UE where the UE capability information includes the coherence capability information, and $\beta_2$ is a ratio $$\left(\frac{\rho_0}{\rho}\right)$$

of a number ($\rho_0$) of antenna ports with non-zero PUSCH transmission power to a maximum number ($\rho$) of sounding reference signal (SRS) ports supported by the UE in one SRS resource, where the coherence capability is one of full-coherence, partial-coherence, or non-coherence, full-coherence indicating that all antenna ports at the UE can be used to transmit a layer of UL data, partial-coherence indicating that only a pair of antenna ports at the UE can be used to transmit a layer of UL data, and non-coherence indicating that only a single antenna port at the UE can be used to transmit a layer of UL data. Furthermore, $$\beta_1 = \max\left(1, \frac{G}{R}\right),$$

R is the number of layers indicated by the TPMI, and G is the number of coherent antenna port groups given by:

| Coherence capability | Number of antenna ports = 2 | Number of antenna ports = 4 |
|---|---|---|
| non-coherence | 2 | 4 |
| partial-coherence |   | 2 |
| full-coherence | 1 | 1 |

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for an uplink (UL) power control, the UE comprising:
    a transceiver; and
    a controller operably coupled with the transceiver and configured to:
        receive, from a base station (BS), a message including a configuration of a physical uplink shared channel (PUSCH),
        receive, from the BS, downlink control information (DCI) including a transmit precoding matrix indicator (TPMI),
        determine a power level for a plurality of antenna ports at the UE based on a power scaling factor, wherein the power scaling factor is determined based on the configuration and the TPMI, and
        transmit, to the BS, UL data via the PUSCH based on the determined power level for the plurality of antenna ports at the UE,
    wherein the TPMI indicates a precoding matrix and a number of layers used to transmit the UL data via the PUSCH, and
    wherein the power scaling factor is one of two values based on the configuration, the first of the two values is one and the second of the two values is associated with a number of antenna ports with non-zero PUSCH transmission power.

2. The UE of claim 1, wherein:
    the power scaling factor ($\beta$) scales a linear value ($\hat{P}$) of UL transmit power; and
    the linear value ($\hat{P}$) of the UL transmit power after power scaling, $\beta \times \hat{P}$, is divided equally across each antenna port on which the UE transmits the UL data via the PUSCH with non-zero power.

3. The UE of claim 1, wherein the transceiver is further configured to transmit UE capability information including a full power transmission capability of the UE.

4. The UE of claim 3, wherein the configuration is associated with the UE capability information.

5. The UE of claim 1, wherein the second of the two values corresponds to a ratio of a number of antenna ports with non-zero PUSCH transmission power over a maximum number of sounding reference signal (SRS) ports in one SRS resource.

6. A base station (BS) for an uplink (UL) power control, the BS comprising:
    a transceiver; and
    a controller operably coupled with the transceiver and configured to:
        transmit, to a user equipment (UE), a message including a configuration of a physical uplink shared channel (PUSCH),
        transmit, to the UE, downlink control information (DCI) including a transmit precoding matrix indicator (TPMI), and
        receive, from the UE, UL data via the PUSCH based on a power level for a plurality of antenna ports at the UE,
    wherein the TPMI indicates a precoding matrix and a number of layers used to transmit the UL data via the PUSCH,
    wherein the power level for the plurality of antenna ports at the UE is according to a power scaling factor,
    wherein the power scaling factor is indicated based on the configuration and the TPMI, and
    wherein the power scaling factor is one of two values based on the configuration, the first of the two values is one and the second of the two values is associated with a number of antenna ports with non-zero PUSCH transmission power.

7. The BS of claim 6, wherein:
    the power scaling factor ($\beta$) scales a linear value ($\hat{P}$) of UL transmit power; and
    the linear value ($\hat{P}$) of the UL transmit power after power scaling, $\beta \times \hat{P}$, is divided equally across each antenna port on which the UE transmits the UL data via the PUSCH with non-zero power.

8. The BS of claim 6, wherein the transceiver is further configured to receive, from the UE, UE capability information including a full power transmission capability of the UE.

9. The BS of claim 8, wherein the configuration is associated with the UE capability information.

10. The BS of claim 6, wherein the second of the two values corresponds to a ratio of a number of antenna ports with non-zero PUSCH transmission power over a maximum number of sounding reference signal (SRS) ports in one SRS resource.

11. A method performed of a user equipment (UE) for an uplink (UL) power control, the method comprising:
    receiving, from a base station (BS), a message including a configuration of a physical uplink shared channel (PUSCH);
    receive, from the BS, downlink control information (DCI) including a transmit precoding matrix indicator (TPMI);
    determining a power level for a plurality of antenna ports at the UE based on a power scaling factor, wherein the power scaling factor is determined based on the configuration and the TPMI; and transmitting, to the BS, UL data via the PUSCH based on the determined power level for the plurality of antenna ports at the UE, wherein the TPMI indicates a precoding matrix and a number of layers used to transmit the UL data via the PUSCH, and wherein the power scaling factor is one of two values based on the configuration, the first of the two values is one and the second of the two values is associated with a number of antenna ports with non-zero PUSCH transmission power.

12. The method of claim 11, wherein:

the power scaling factor ($\beta$) scales a linear value ($\hat{P}$) of UL transmit power; and the linear value ($\hat{P}$) of the UL transmit power after power scaling, $\beta \times \hat{P}$, is divided equally across each antenna port on which the UE transmits the UL data via the PUSCH with non-zero power.

13. The method of claim 11, further comprising:

transmitting UE capability information including a full power transmission capability of the UE.

14. The method of claim 13, the configuration is associated with the UE capability information.

15. The method of claim 11, wherein the second of the two values corresponds to a ratio of a number of antenna ports with non-zero PUSCH transmission power over a maximum number of sounding reference signal (SRS) ports in one SRS resource.

16. A method performed of a base station (BS) for an uplink (UL) power control, the method comprising:

transmitting, to a user equipment (UE), a message including a configuration of a physical uplink shared channel (PUSCH);

transmitting, to the UE, downlink control information (DCI) including a transmit precoding matrix indicator (TPMI); and receiving, from the UE, UL data via the PUSCH based on a power level for a plurality of antenna ports at the UE, wherein the TPMI indicates a precoding matrix and a number of layers used to transmit the UL data via the PUSCH, wherein the power level for the plurality of antenna ports at the UE is according to a power scaling factor, wherein the power scaling factor is indicated based on the configuration and the TPMI, and wherein the power scaling factor is one of two values based on the configuration, the first of the two values is one and the second of the two values is associated with a number of antenna ports with non-zero PUSCH transmission power.

17. The method of claim 16, wherein:

the power scaling factor ($\beta$) scales a linear value ($\hat{P}$) of UL transmit power; and the linear value ($\hat{P}$) of the UL transmit power after power scaling, $\beta \times \hat{P}$, is divided equally across each antenna port on which the UE transmits the UL data via the PUSCH with non-zero power.

18. The method of claim 16, further comprising:

receiving, from the UE, UE capability information including a full power transmission capability of the UE.

19. The method of claim 18, wherein the configuration is associated with the UE capability information.

20. The method of claim 16, wherein the second of the two values corresponds to a ratio of a number of antenna ports with non-zero PUSCH transmission power over a maximum number of sounding reference signal (SRS) ports in one SRS resource.

* * * * *